US012574152B1

(12) United States Patent
Li

(10) Patent No.: US 12,574,152 B1
(45) Date of Patent: Mar. 10, 2026

(54) DATA RETRANSMISSION PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Zhicheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 623 days.

(21) Appl. No.: 18/077,733

(22) Filed: Dec. 8, 2022

Related U.S. Application Data

(63) Continuation of application No. PCT/CN2022/088788, filed on Apr. 24, 2022.

(30) Foreign Application Priority Data

May 25, 2021 (CN) .......................... 202110569177.3

(51) Int. Cl.
*H04L 1/08* (2006.01)
*H04L 1/1607* (2023.01)

(52) U.S. Cl.
CPC .............. *H04L 1/08* (2013.01); *H04L 1/1642* (2013.01)

(58) Field of Classification Search
CPC ....... H04L 1/08; H04L 1/1642; H04L 1/1858; H04L 1/189
See application file for complete search history.

(56) References Cited

U.S. PATENT DOCUMENTS

| | | | |
|---|---|---|---|
| 7,180,896 | B1 | 2/2007 | Okumura |
| 7,546,508 | B2 | 6/2009 | Greer |

(Continued)

FOREIGN PATENT DOCUMENTS

| | | |
|---|---|---|
| CN | 101069221 A | 11/2007 |
| CN | 104486051 A | 4/2015 |

(Continued)

OTHER PUBLICATIONS

The European Patent Office (EPO) The Extended European Search Report for 22810283.6, Apr. 29, 2024 10 Pages.

(Continued)

*Primary Examiner* — Yemane Mesfin
*Assistant Examiner* — Salma Ayad
(74) *Attorney, Agent, or Firm* — Anova Law Group, PLLC

(57) ABSTRACT

This application provides a data retransmission processing method and apparatus, a computer device, and a storage medium. The method includes determining a quantity threshold of data packet retransmissions within a retransmission period based on a data packet loss rate, and obtaining a set of sequence numbers including respective sequence numbers of data packets to be retransmitted within the retransmission period; determining respective key sequence numbers of key data packets matching the set of sequence numbers; obtaining a target sequence number from the key sequence numbers, and deleting sequence numbers less than or equal to the target sequence number from the set of sequence numbers, the quantity of the remaining sequence numbers being less than or equal to the quantity threshold of data packet retransmissions; and requesting a retransmission of data packets that correspond to the sequence numbers remaining in the set of sequence numbers.

20 Claims, 7 Drawing Sheets

(56) References Cited

U.S. PATENT DOCUMENTS

| | | | |
|---|---|---|---|
| 2009/0158417 A1 | 6/2009 | Khanna et al. | |
| 2010/0083067 A1 | 4/2010 | Fujimoto et al. | |
| 2018/0278372 A1 | 9/2018 | Liang | |
| 2021/0194635 A1 | 6/2021 | Cedronius et al. | |
| 2022/0086261 A1* | 3/2022 | Tian | H04L 1/1642 |

FOREIGN PATENT DOCUMENTS

| | | | |
|---|---|---|---|
| CN | 106067847 A | 11/2016 | |
| CN | 107864084 A | 3/2018 | |
| CN | 108564596 A | 9/2018 | |
| CN | 108781139 A | 11/2018 | |
| CN | 113037440 A | 6/2021 | |
| EP | 1204249 A1 | 5/2002 | |
| JP | 2002204279 A | 7/2002 | |
| JP | 2003333577 A | 4/2005 | |
| JP | 2007150859 A | 6/2007 | |
| JP | 2017537498 A | 5/2019 | |
| WO | 0199355 A1 | 12/2001 | |
| WO | WO-2007061087 A1 * | 5/2007 | H04L 65/752 |
| WO | 2016067561 A1 | 5/2016 | |
| WO | WO-2018127020 A1 * | 7/2018 | H04L 1/1848 |

OTHER PUBLICATIONS

Indian Patent Office Examination report for Application No. 202337033607 Mar. 26, 2025 6 pages.

The Japan Patent Office (JPO) Notification of Reasons for Refusal for Application No. 2023-548347 Aug. 29, 2024 6 Pages (including translation).

The World Intellectual Property Organization (WIPO) International Search Report for PCT/CN2022/088788 Jul. 13, 2022 7 Pages (including translation).

Minmin Zhang., "Application Research on Network Adaptability Technology in Multimedia Conference", Jan. 31, 2010, pp. 244-248, Proceedings of the 6th Annual Academic Conference of China Communications Society.

Y.-K. Wang et al., "RTP Payload Format for H.264 Video", May 2021, Internet Engineering Task Force (IETF). https://www.rfc-editor.org/rfc/rfc6184.

* cited by examiner

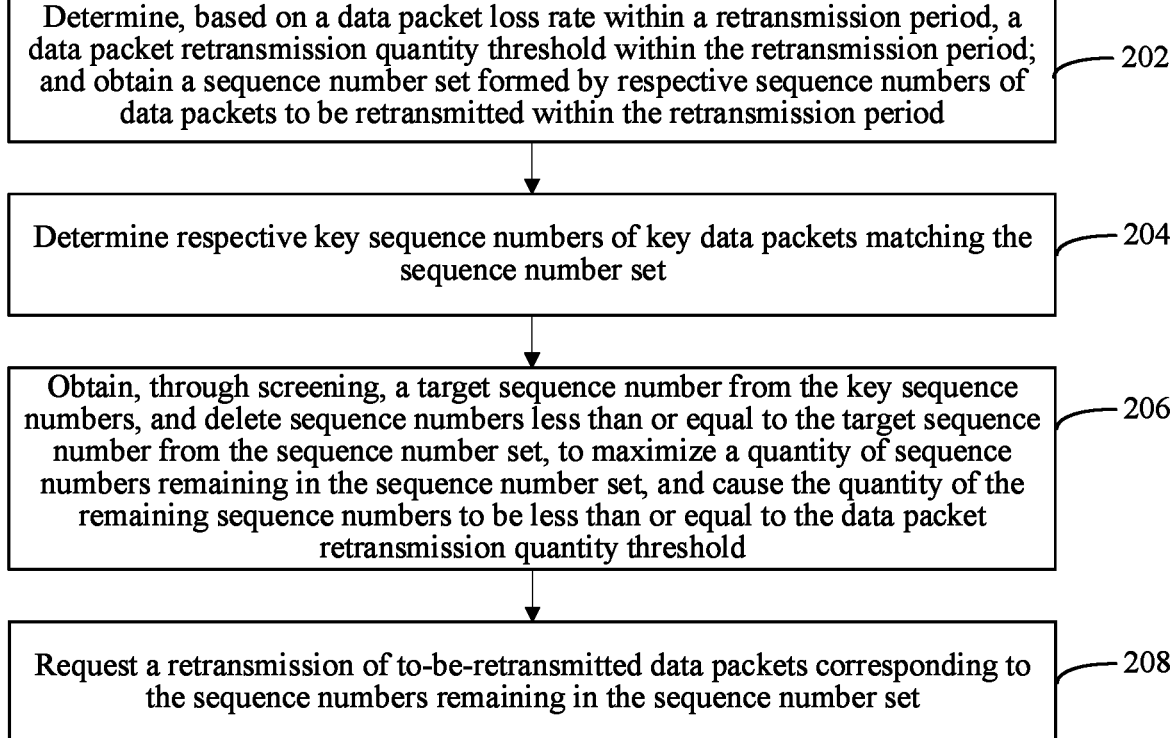

| Determine, based on a data packet loss rate within a retransmission period, a data packet retransmission quantity threshold within the retransmission period; and obtain a sequence number set formed by respective sequence numbers of data packets to be retransmitted within the retransmission period | 202 |

| Determine respective key sequence numbers of key data packets matching the sequence number set | 204 |

| Obtain, through screening, a target sequence number from the key sequence numbers, and delete sequence numbers less than or equal to the target sequence number from the sequence number set, to maximize a quantity of sequence numbers remaining in the sequence number set, and cause the quantity of the remaining sequence numbers to be less than or equal to the data packet retransmission quantity threshold | 206 |

| Request a retransmission of to-be-retransmitted data packets corresponding to the sequence numbers remaining in the sequence number set | 208 |

FIG. 2

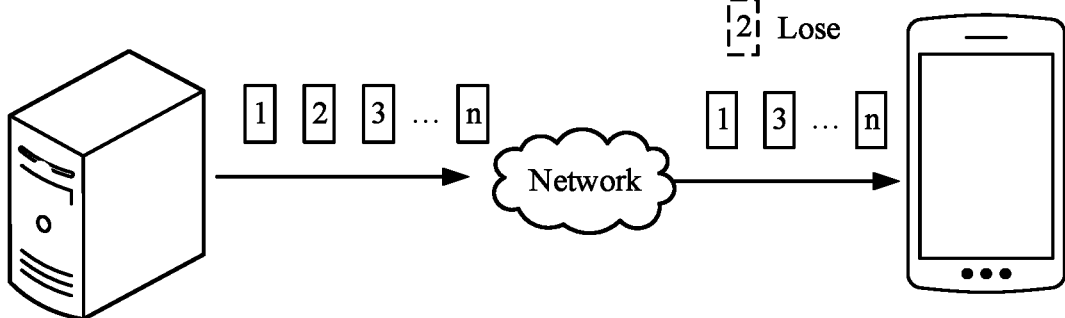

FIG. 3

DATA RETRANSMISSION PROCESSING METHOD AND APPARATUS, COMPUTER DEVICE, AND STORAGE MEDIUM

RELATED APPLICATIONS

This application is a continuation of PCT Application No. PCT/CN2022/088788, filed on Apr. 24, 2022, which claims priority to Chinese Patent Application No. 2021105691773, entitled "DATA RETRANSMISSION PROCESSING METHOD AND APPARATUS, COMPUTER DEVICE, AND STORAGE MEDIUM" and filed with the China National Intellectual Property Administration on May 25, 2021. The two applications are incorporated herein by reference in their entirety.

FIELD OF THE TECHNOLOGY

This application relates to the field of network communication technologies, and in particular, to a data retransmission processing method and apparatus, a computer device, a computer-readable storage medium, and a computer program product.

BACKGROUND OF THE DISCLOSURE

With the development of communication technologies, use of network communication becomes more widespread in life, and requirements for the quality of communication become higher. In view of timeliness of data transmission and resource utilization, a user datagram protocol (UDP) message is used for data transmission during a communication process.

Because data is transmitted in a network and a packet may get lost, a receiving end may need to initiate a retransmission request to a sending end according to the packet loss situation. If the sending end receives too many retransmission requests at the same time, a network jitter or delay may happen, affecting the effectiveness of data transmission.

SUMMARY

Various embodiments of this application provide a data retransmission processing method and apparatus, a computer device, a computer-readable storage medium, and a computer program product that can improve the data transmission effect.

One aspect of the present disclosure provides a data retransmission processing method, performed by a computer device. The method includes determining a quantity threshold of data packet retransmissions within a retransmission period based on a data packet loss rate within the retransmission period, and obtaining a set of sequence numbers including respective sequence numbers of data packets to be retransmitted within the retransmission period; determining respective key sequence numbers of key data packets matching the set of sequence numbers; obtaining a target sequence number from the key sequence numbers, and deleting sequence numbers less than or equal to the target sequence number from the set of sequence numbers, to maximize a quantity of sequence numbers remaining in the set of sequence numbers, the quantity of the remaining sequence numbers being less than or equal to the quantity threshold of data packet retransmissions; and requesting a retransmission of data packets to be retransmitted that correspond to the sequence numbers remaining in the set of sequence numbers.

Another aspect of the present disclosure provides a computer device, including a memory and one or more processors, the memory storing computer-readable instructions, the computer-readable instructions, when executed by the one or more processors, causing the one or more processors to implement a data retransmission processing method including determining a quantity threshold of data packet retransmissions within a retransmission period based on a data packet loss rate within the retransmission period, and obtaining a set of sequence numbers including respective sequence numbers of data packets to be retransmitted within the retransmission period; determining respective key sequence numbers of key data packets matching the set of sequence numbers; obtaining a target sequence number from the key sequence numbers, and deleting sequence numbers less than or equal to the target sequence number from the set of sequence numbers, to maximize a quantity of sequence numbers remaining in the set of sequence numbers, the quantity of the remaining sequence numbers being less than or equal to the quantity threshold of data packet retransmissions; and requesting a retransmission of data packets to be retransmitted that correspond to the sequence numbers remaining in the set of sequence numbers.

Another aspect of the present disclosure provides one or more non-transitory computer-readable storage media, storing computer-readable instructions, the computer-readable instructions, when executed by one or more processors, causing the one or more processors to implement a data retransmission processing method including determining a quantity threshold of data packet retransmissions within a retransmission period based on a data packet loss rate within the retransmission period, and obtaining a set of sequence numbers including respective sequence numbers of data packets to be retransmitted within the retransmission period; determining respective key sequence numbers of key data packets matching the set of sequence numbers; obtaining a target sequence number from the key sequence numbers, and deleting sequence numbers less than or equal to the target sequence number from the set of sequence numbers, to maximize a quantity of sequence numbers remaining in the set of sequence numbers, the quantity of the remaining sequence numbers being less than or equal to the quantity threshold of data packet retransmissions; and requesting a retransmission of data packets to be retransmitted that correspond to the sequence numbers remaining in the set of sequence numbers.

Details of one or more embodiments of this application are provided in the accompany drawings and descriptions below. Other features, objectives, and advantages of this application will become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

FIG. 2 is a schematic flowchart of a data retransmission processing method according to an embodiment.

FIG. 3 is a schematic diagram of a packet loss phenomenon in a data transmission process according to an embodiment.

DESCRIPTION OF EMBODIMENTS

To make the objectives, technical solutions, and advantages of this application clearer and more understandable, this application is further described in detail below with reference to accompanying drawings and embodiments. It is to be understood that the specific embodiments described herein are only used for explaining this application, and are not used for limiting this application.

A data retransmission processing method provided in this application may be implemented based on a cloud technology.

Figure 1:
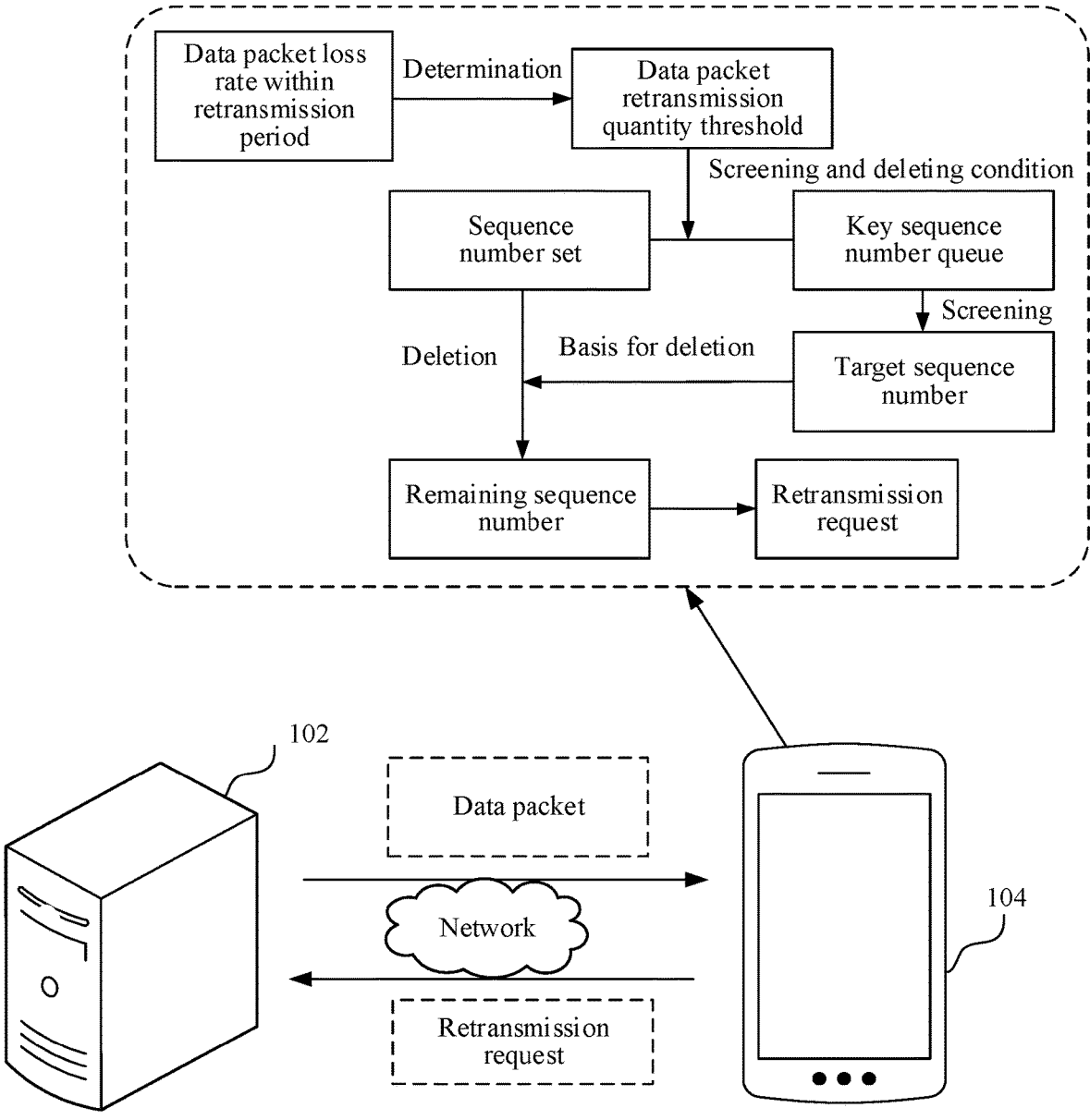
FIG. 1 is a diagram of an application environment of a data retransmission processing method according to an embodiment.

The data retransmission processing method provided in this application may be applied to an application environment shown in FIG. 1. In FIG. 1, a sending end 102 communicates with a receiving end 104 through a network. The sending end 102 sends data to the receiving end 104. The receiving end 104 determines, based on a data packet loss rate within a retransmission period, a quantity threshold of data packet retransmissions within the retransmission period, and obtains a set of sequence numbers formed by respective sequence numbers of data packets to be retransmitted within the retransmission period. Respective key sequence numbers of key data packets matching the set of sequence numbers are determined. The receiving end 104 obtains, through screening, a target sequence number from the key sequence numbers, and deletes sequence numbers less than or equal to the target sequence number from the set of sequence numbers, to maximize a quantity of sequence numbers remaining in the set of sequence numbers, and cause the quantity of the remaining sequence numbers to be less than or equal to the quantity threshold of data packet retransmissions. The receiving end 104 requests, from the sending end 102, a retransmission of data packets to be retransmitted corresponding to the sequence numbers remaining in the set of sequence numbers.

The receiving end 104 may be, but is not limited to, a desktop computer, a notebook computer, a smartphone, a tablet computer, or a portable wearable device. The sending end 102 may be a server. The server may be an independent physical server, or may be a server cluster including multiple physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

In an embodiment, as shown in FIG. 2, a data retransmission processing method is provided. Description is made by using an example in which the method is applied to the receiving end shown in FIG. 1. The method includes the following steps:

Step 202: Determine, based on a data packet loss rate within a retransmission period, a quantity threshold of data packet retransmissions within the retransmission period; and obtain a set of sequence numbers formed by respective sequence numbers of data packets to be retransmitted within the retransmission period.

The retransmission period refers to durations indicated by multiple time periods divided according to the time. The receiving end detects whether there is a packet loss situation in the received data within each time period, and sends a retransmission request to the sending end when the packet loss situation meets a retransmission condition. The sending end and the receiving end are transmission objects of data. It is to be understood that the sending end and the receiving end are a set of relative concepts. In different application scenarios, the sending end may also be used as the receiving end for receiving data, and the receiving end may also be used as the sending end for sending data. Whether the computer device is the sending end or the receiving end may be determined according to a transmission direction of data.

The packet loss refers to a phenomenon that data of one or multiple (referring to two or more) data packets cannot be transmitted from the sending end to the receiving end through a network. As shown in FIG. 3, the sending end sends n data packets with sequence numbers of 1 to n, but a data packet with a sequence number of 2 is not detected in the data packets received by the receiving end. A packet loss phenomenon of the data packet with the sequence number of 2 occurs. However, the packet loss may cause a network jitter in scenarios such as a streaming media technology, a Voice over Internet Protocol (VoTP), an online game and a video conference. The packet loss does not necessarily mean that there is a problem in data exchange. To some extent, the packet loss may be accepted by both transmission parties. The retransmission condition is a condition that is met when the packet loss situation cannot be accepted by both transmission parties. Specifically, the retransmission condition may be one of or a combination of conditions such as a condition that a quantity of retransmitted data packets reaches a quantity threshold, and a condition that a packet loss rate within a certain period reaches a packet loss rate threshold.

The packet loss rate (loss tolerance) refers to a ratio of a quantity of lost data packets to a sent data set. In particular, the data packet loss rate may be a ratio of a quantity of data packets received within a time period to a quantity of data packets to be received. The packet loss rate is related to a data packet length and a packet sending frequency. Normally, when traffic of a gigabit network adapter is greater than 200 Mbps, the packet loss rate is less than 5/10000; and when traffic of a 100 M network adapter is greater than 60 Mbps, the packet loss rate is less than 1/10000. In a specific application, the packet loss rate may be obtained by calculating a ratio of a difference between a quantity of output messages of the sending end and a quantity of input messages of the receiving end to the quantity of input messages, that is, [(input message–output message)/input message] *100%.

The quantity threshold of data packet retransmissions refers to a quantity threshold of data packets that request a retransmission within the retransmission period. Specifically, the receiving end calculates the quantity threshold of data packet retransmissions within the retransmission period based on the data packet loss rate within the retransmission period and a transmission bandwidth of the receiving end. The transmission bandwidth is used for identifying a volume of data that passes through a link in unit time. Because the data packet loss rate within the retransmission period changes in real time, by determining the quantity threshold of data packet retransmissions based on the data packet loss rate within the retransmission period, the quantity threshold of data packet retransmissions within the retransmission period can be dynamically adjusted. Compared with a manner of setting a fixed quantity threshold of data packet retransmissions, dynamic adjustment can effectively avoid an intermittent network storm, the intermittent network storm being resulted from excessive retransmission requests that need to be processed by the receiving end at a same moment when network jitter and packet loss are very serious.

The data packet to be retransmitted refers to a data packet that needs to be resent by the sending end when it is detected that a packet loss phenomenon occurs. A data message received by the receiving end carries a data packet, and a header of the message carries a sequence number of the data packet. The sequence number is used for identifying a sending sequence of multiple data packets corresponding to the sending end. The receiving end may infer the sequence number of the lost data packet based on the sequence number of the data packet that has been received, to request the sending end to resend the data packet based on the sequence number of the lost data packet.

The set of sequence numbers is a set that is formed by the respective sequence numbers of the data packets to be retransmitted. The set of sequence numbers is updated in real time. When there is a new data packet to be retransmitted, a sequence number of the data packet to be retransmitted may be added to the set of sequence numbers. When the data packet to be retransmitted is received, the sequence number of the data packet to be retransmitted is deleted from the set of sequence numbers. In one application, the set of sequence numbers may be a retransmission queue that is formed after sorting based on values of sequence numbers.

Step 204: Determine key sequence numbers of key data packets matching the set of sequence numbers.

The key data packet is a data packet of particular significance in the data packets received by the receiving end. Specifically, the key data packet is a data packet that is used for being combined with other data packets to obtain presentation data during a data rendering process. The key data packet may be, for example, a data packet corresponding to a key frame in a video data packet. When receiving a data packet corresponding to a transmission task, the receiving end may determine whether the data packet is a key data packet according to a data packet category identifier of the data packet. The key sequence number refers to a sequence number of the key data packet.

The set of sequence numbers includes a sequence number of packet loss data of received data in a transmission task. Therefore, the set of sequence numbers corresponds to the transmission task to which the received data belongs, and different transmission tasks correspond to different set of sequence numbers. The key data packets matching the set of sequence numbers are the same key data packets as the transmission task to which the data packet to be retransmitted belongs. Further, based on the set of sequence numbers, the key data packets received in the transmission task may further be screened, to obtain a key data packet whose sequence number is within a sequence number interval range represented by the set of sequence numbers, and determine a key sequence number of the key data packet obtained through screening.

In a specific application, the receiving end may first determine received data packets matching the data packets to be retransmitted. Then, based on the sequence number range of the set of sequence numbers formed by the respective sequence numbers of the data packets to be retransmitted and through the data packet category identifier, the receiving end may determine the key data packet whose sequence number is within the sequence number range from the matched received data packets, and use the sequence number of the key data packet as the key sequence number.

Step 206: Obtain, through screening, a target sequence number from the key sequence numbers, and delete sequence numbers less than or equal to the target sequence number from the set of sequence numbers, to maximize a quantity of sequence numbers remaining in the set of sequence numbers, and cause the quantity of the remaining sequence numbers to be less than or equal to the quantity threshold of data packet retransmissions.

The target sequence number is a key sequence number that is obtained by screening the key sequence numbers and meets a screening condition. A quantity of the target sequence number is one. The screening condition may be that after the sequence numbers less than or equal to the target sequence number are deleted from the set of sequence numbers, the quantity of the sequence numbers remaining in the set of sequence numbers is maximized, and the quantity of the remaining sequence numbers is less than or equal to the quantity threshold of data packet retransmissions. The sequence number less than or equal to the target sequence number includes the sequence number less than the target sequence number and the sequence number equal to the target sequence number. Quantity maximization refers to a selection that is made within a range allowed by the constraint and maximizes the quantity of the sequence numbers remaining in the set of sequence numbers.

Specifically, the receiving end may, by separately using each key sequence number as a candidate sequence number, and respectively deleting sequence numbers less than or equal to the candidate sequence number from the set of sequence numbers, respectively record the quantity of the sequence numbers remaining in the set of sequence numbers; obtain, through screening, sequence numbers that reach a standard and cause the quantity of the remaining sequence numbers to be less than or equal to the quantity threshold of data packet retransmissions; and then obtain, through screening, the target sequence number that maximizes the quantity of the remaining sequence numbers from the sequence numbers that reach a standard.

Specifically, the receiving end may alternatively sort the key sequence numbers based on values of sequence numbers, successively use, starting from a key sequence number whose sequence number value is the smallest, the respective key sequence numbers as the target sequence number, and delete the sequence numbers less than or equal to the target sequence number from the set of sequence numbers until the quantity of the sequence numbers remaining in the set of sequence numbers becomes less than or equal to the quantity threshold of data packet retransmissions.

By deleting, from the set of sequence numbers that is formed based on the respective sequence numbers of the data packets to be retransmitted, the sequence numbers less than or equal to the target sequence number, the sequence number deletion processing can be accurately performed for each case of using the respective key sequence numbers as the target sequence number, and the accuracy of data processing can be improved.

Step 208: Request a retransmission of data packets to be retransmitted that are indicated by the sequence numbers remaining in the set of sequence numbers.

Figure 4:
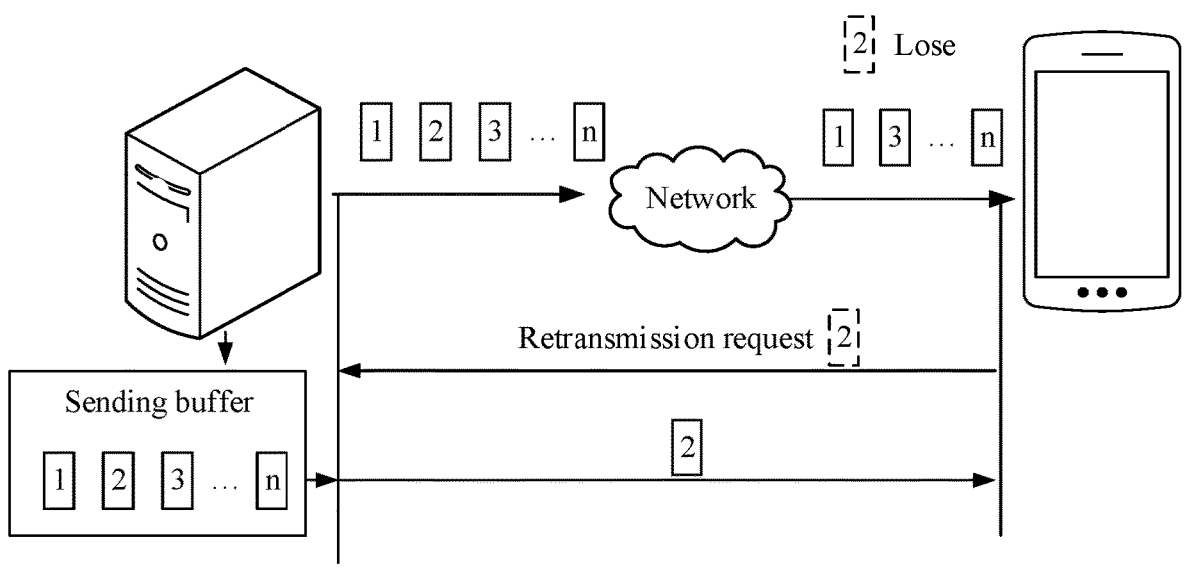
FIG. 4 is a schematic diagram of interaction between a sending end and a receiving end of data retransmission processing according to an embodiment.

The "request a retransmission" means that the receiving end sends a retransmission request to the sending end, to cause the sending end to resend the data packet that the receiving end requests. For a data packet that the receiving end loses, specific contents of the data packet cannot be obtained because the lost data packet has not been received. However, because sequence numbers of the data packets sent by the sending end are continuous, the receiving end may determine a sequence number of the lost data packet based on sequence numbers that have been successfully received. Therefore, the receiving end may request the sending end to retransmit the lost data packet based on the sequence number. As shown in FIG. 4, in a specific application, a negative acknowledgement (NACK, which is a negative feedback, a receiving party notifying a sending party only when no data is received) of the receiving end sends a NACK message to the sending end after the receiving end detects a data packet loss. The sending end finds the data packet that needs to be resent in a sending buffer according to the sequence number in the NACK message, and resends, to the receiving end, the data packet that needs to be resent.

Specifically, the receiving end generates, based on sequence numbers remaining in the set of sequence numbers, retransmission requests corresponding one-to-one to the remaining sequence numbers, and sends the generated retransmission requests to the sending end, to request the retransmission of the data packets to be retransmitted that are indicated by the sequence numbers remaining in the set of sequence numbers.

According to the foregoing data retransmission processing method, the quantity threshold of data packet retransmissions is determined based on the data packet loss rate, so that the quantity threshold of data packet retransmissions may be dynamically adjusted based on the data packet loss rate within the retransmission period. Based on the data packets to be retransmitted within the retransmission period and the respective key data packets matching the data packets to be retransmitted, the target sequence number is obtained through screening from the key sequence numbers, the sequence numbers less than or equal to the target sequence number are deleted from the set of sequence numbers that is formed based on the respective sequence numbers of the data packets to be retransmitted, so that the quantity of the sequence numbers remaining in the set of sequence numbers is maximized, and the quantity of the remaining sequence numbers is less than or equal to the quantity threshold of data packet retransmissions. On the premise of reducing the data packets to be retransmitted, the data packets to be retransmitted that request a retransmission are maximized. By performing the retransmission request processing based on the retransmission period, the retransmission of the data packets to be retransmitted corresponding to the deleted sequence numbers can be requested in a previous retransmission period, which can not only avoid missing the retransmission request of the data packets to be retransmitted, but also effectively control the quantity of the data packets to be retransmitted that request a retransmission within each retransmission period. The network jitter or delay is avoided, and the data transmission effect is improved.

Further, the transmission bandwidth may be used in whole or in part for the transmission of retransmission data packets. In order not to affect the normal transmission of other data packets, part of the transmission bandwidth may be selected as a retransmission bandwidth. In a specific application, the receiving end calculates the quantity threshold of data packet retransmissions within the retransmission period based on the data packet loss rate within the retransmission period and the retransmission bandwidth in the transmission bandwidth of the receiving end.

In an embodiment, the determining, based on a data packet loss rate within a retransmission period, a quantity threshold of data packet retransmissions within the retransmission period includes: determining, based on a volume of receivable data of a retransmission bandwidth in a transmission bandwidth, a threshold of volume of received data when the data packet loss rate is reached within the retransmission period; and determining, based on a data volume of each data packet, a quantity threshold of data packet retransmissions corresponding to the threshold of volume of received data.

The volume of receivable data refers to a maximum volume of data that can be transferred on the line in unit time, and the common unit is bps. The transmission bandwidth of the receiving end is a fixed value, and the retransmission bandwidth in the transmission bandwidth may be determined by a set weight parameter. For example, a weight parameter of the retransmission bandwidth in the transmission bandwidth is 20%. The weight parameter may be obtained through fitting based on a ratio of historical retransmission data to all transmission data (including normal transmission data and retransmission data). The threshold of volume of received data when the data packet loss rate is reached refers to a volume of data that can be normally received when the existence of data packet loss is considered. For example, when the volume of receivable data of the transmission bandwidth of the receiving end is 2 Mbps and the weight parameter is 0.2, the volume of receivable data of the retransmission bandwidth in the transmission bandwidth is 0.4 Mbps. If the data packet loss rate within the retransmission period is 20%, the threshold of volume of received data when the data packet loss rate is reached in unit time is 0.4 Mbps*(1−20%)=0.32 Mbps, that is, 40000 byte/s. Then, calculation is performed based on the data volume of each data packet, for example, when a data volume of a single data packet is 1500 byte, the quantity threshold of data packet retransmissions corresponding to the threshold of volume of received data in unit time is 26 per second. With reference to the duration indicated by the retransmission period, the quantity threshold of data packet retransmissions corresponding to the threshold of volume of received data within the retransmission period is obtained.

Further, because the retransmission data accounts for only part of the transmission data, a retransmission success rate of the retransmission data may also be adjusted and updated through a packet loss rate weight parameter obtained based on historical data. For example, when the data packet loss rate within the retransmission period is 40%, and the packet loss rate weight parameter obtained based on historical data is 0.9, the data transmission success rate of the retransmission data is 1−0.9*(1−40%)=72%. By setting the packet loss rate weight parameter, a more accurate calculation result of the data transmission success rate of the retransmission data can be obtained, thereby obtaining an accurate quantity threshold of data packet retransmissions.

Specifically, based on a transmission code rate corresponding to the transmission bandwidth and a ratio of the retransmission bandwidth to the transmission bandwidth, the receiving end obtains a retransmission code rate corresponding to the retransmission bandwidth. Based on the retransmission success rate of the retransmission data corresponding to the data packet loss rate within the retransmission period, the receiving end determines an optimized retransmission code rate within the retransmission period. Based on the data volume of each data packet, the receiving end determines a quantity threshold of data packet retransmissions corresponding to the optimized retransmission code rate.

In this embodiment, based on the retransmission bandwidth and the data packet loss rate, an accurate and reliable quantity threshold of data packet retransmissions can be obtained. Compared with a manner of setting a fixed quantity threshold of data packet retransmissions, dynamic adjustment can effectively avoid an intermittent network storm, the intermittent network storm being resulted from excessive retransmission requests that need to be processed by the receiving end at a same moment when network jitter and packet loss are very serious.

In an embodiment, the determining respective key sequence numbers of key data packets matching the set of sequence numbers includes:

obtaining, through screening, a maximum sequence number and a minimum sequence number from the set of sequence numbers, and obtaining a key set of sequence numbers that is formed based on respective sequence numbers of the key data packets and matches the set of sequence numbers; and obtaining, through screening, key sequence numbers that are greater than the minimum sequence number and less than the maximum sequence number from the key set of sequence numbers.

The maximum sequence number and the minimum sequence number may be obtained by sorting the respective sequence numbers of the data packets to be retransmitted. In a specific application, the set of sequence numbers may be a retransmission queue that is formed after sorting based on values of sequence numbers, the beginning and the end of the retransmission queue being the maximum sequence number and the minimum sequence number. For example, when the sequence numbers are sorted in descending order, the first sequence number of the retransmission queue is the maximum sequence number, and the last sequence number is the minimum sequence number; and when the sequence numbers are sorted in ascending order, the first sequence number of the retransmission queue is the minimum sequence number, and the last sequence number is the maximum sequence number. The key set of sequence numbers includes the respective sequence numbers of the key data packets. In order to facilitate the distinction between the sequence number of the key data packet and the sequence number of the data packet to be retransmitted, the sequence number of the key data packet is defined as the key sequence number. The key data packet is part of the data packets that the receiving end has received, and the data packet to be retransmitted is a data packet that the receiving end has not received. The data packet to be retransmitted is determined based on the received data packet, and the received data packet corresponds to the transmission task. Similarly, the key set of sequence numbers formed based on the key data packets in the received data packets also corresponds to the transmission task. Based on the transmission task, the key set of sequence numbers matching the set of sequence numbers may be determined.

In a specific application, by traversing the key set of sequence numbers, each key sequence number in the key set of sequence numbers is respectively compared with the maximum sequence number and the minimum sequence number. If a key sequence number is greater than the minimum sequence number and less than the maximum sequence number, it is determined that the key sequence number is a key sequence number matching the set of sequence numbers. If a key sequence number is less than the minimum sequence number or greater than the maximum sequence number, the key sequence number is skipped and a comparison of the next key sequence number is performed until the traversal of the key set of sequence numbers is completed, thereby obtaining, through screening, the matched key sequence numbers. By traversing the key set of sequence numbers, the accuracy of the matched key sequence numbers which are obtained through screening can be ensured.

Figure 5:
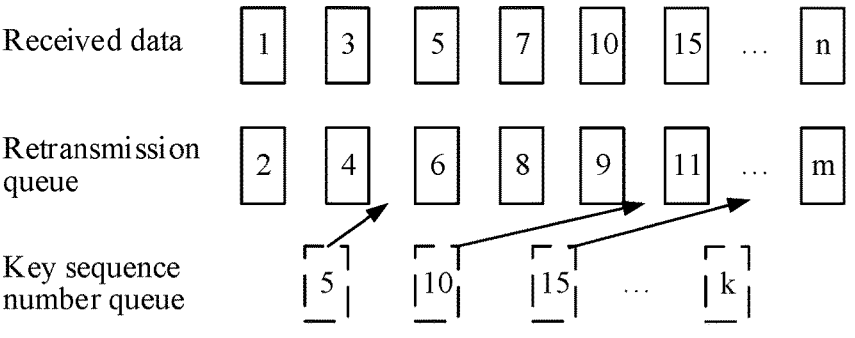
FIG. 5 is a schematic diagram of a retransmission queue and a key sequence number queue in data retransmission processing according to an embodiment.

In another application, the set of sequence numbers may be a retransmission queue that is formed after sorting based on values of the sequence numbers of the data packets to be retransmitted, and the key set of sequence numbers may be a key sequence number queue that is formed after sorting based on values of the key sequence numbers. As shown in FIG. 5, sequence numbers of the received data packets include 1, 3, 5, 7, 10, 15, . . . , n; sequence numbers in the retransmission queue include 2, 4, 6, 8, 9, 11, . . . , m; and sequence numbers in the key sequence number queue include 5, 10, 15, 19, . . . , k. The retransmission queue and the key sequence number queue carry task identifiers corresponding to transmission data. Based on the task identifiers, a matched retransmission queue and a matched key sequence number queue may be determined. Based on the minimum sequence number in the retransmission queue, a flag key sequence number in the key sequence number queue is determined, the flag key sequence number being greater than the minimum sequence number and having a smallest difference from the minimum sequence number. Key sequence numbers greater than or equal to the flag key sequence number are obtained through screening from the key sequence number queue. By sorting based on the values of the key sequence numbers, the accuracy of the matched key sequence numbers which are obtained through screening can be ensured, and a quick screening for the matched key sequence numbers is implemented.

In this embodiment, based on the maximum sequence number and the minimum sequence number in the set of sequence numbers, screening can be further performed on the key data packets, to minimize a quantity of the key data packets, facilitate the reduction in the data processing volume when the target sequence number is obtained through screening from the key sequence numbers of the key data packets subsequently, and improve the data processing efficiency.

In an embodiment, the data retransmission processing method further includes: extracting a data packet category identifier carried in a header corresponding to a received data packet; and adding a sequence number carried in the header to the key set of sequence numbers when the data packet category identifier indicates that the data packet is a key data packet.

The header refers to data used for recording data transmission information in the message, and the message is a data unit for exchange and transmission in a network, that is, a data block to be sent by a site at a time. The message includes the complete data information to be sent, and specifically includes a data packet that needs to be transmitted and corresponding data transmission information, where the data transmission information includes the data packet category identifier of the data packet and the sequence number corresponding to the data packet.

Specifically, when receiving the message, the receiving end extracts the data packet category identifier from the header. If the data packet category identifier indicates a key data packet, the sequence number is extracted from the header, and the sequence number is added to the key set of sequence numbers corresponding to the transmission task to which the message belongs.

In a specific application, an example is used in which the received data packet is a video frame packet. The data packet category identifier includes an I-frame, a P-frame, and a B-frame. The I-frame indicates a key frame and includes a complete picture. This means that the I-frame is a complete preservation of this frame of picture, and only data of the I frame is needed when the I frame is decoded. The P-frame indicates a difference between the frame and a previous key frame (P-frame), and when a P-frame is decoded, a previously-buffered picture plus a difference defined by the frame need to be used to generate a final picture. The P-frame may alternatively be understood as a difference frame. The P-frame has no complete picture data, only data of a picture difference from the previous frame. The B-frame is a bidirectional difference frame, which records differences between the frame and a previous frame and between the frame and a following frame. To decode the B-frame, the previously buffered picture needs to be obtained, and the next picture also needs to be decoded. The final picture is obtained by superimposing the previous and next pictures onto data of the current frame. When the receiving end receives the message and determines that the video frame packet included in the message is a key frame by parsing the header in the message, the sequence number in the message is added to the key frame sequence of the transmission task to which the message belongs.

In this embodiment, by extracting the data packet category identifier from the message, the key data packet in the received data packets can be accurately identified. Compared with a manner in which it is determined whether the data packet is a key data packet by using a parsing result during the data packet rendering, the foregoing manner can effectively improve the data processing efficiency.

In an embodiment, the obtaining, through screening, a target sequence number from the key sequence numbers, and deleting sequence numbers less than or equal to the target sequence number from the set of sequence numbers, to maximize a quantity of sequence numbers remaining in the set of sequence numbers, and cause the quantity of the remaining sequence numbers to be less than or equal to the quantity threshold of data packet retransmissions includes:

successively using the key sequence numbers as a target sequence number in ascending order, and deleting, from the set of sequence numbers that is formed based on the respective sequence numbers of the data packets to be retransmitted, sequence numbers less than or equal to the target sequence number until the quantity of the sequence numbers remaining in the set of sequence numbers becomes less than or equal to the quantity threshold of data packet retransmissions.

If all the data packets received by the receiving end arrive in order, there is no sequence number equal to the target sequence number in the set of sequence numbers. If the key data packet received by the receiving end arrives out of order, before the key data packet arrives, the key data packet may have been taken as the data packet to be retransmitted, and the key sequence number of the key data packet may have been added to the set of sequence numbers. Therefore, there may be a key sequence number in the set of sequence numbers. However, because the receiving end has received the key data packet indicated by the key sequence number, the sequence number equal to the key sequence number may be directly deleted from the set of sequence numbers, to avoid duplicate transmission of the data packet. By deleting, from the set of sequence numbers that is formed based on the respective sequence numbers of the data packets to be retransmitted, the sequence numbers less than or equal to the target sequence number, the sequence number deletion processing can be accurately performed for each case of using the respective key sequence numbers as the target sequence number, and the accuracy of data processing can be improved.

Specifically, based on the key sequence number queue formed by the key sequence numbers sorted in ascending order, and starting from a key sequence number in the key sequence number queue which is greater than the minimum sequence number in the set of sequence numbers, the receiving end successively selects a key sequence number as the target sequence number. The receiving end deletes the sequence numbers less than or equal to the target sequence number from the set of sequence numbers, and determines whether the quantity of the sequence numbers remaining in the set of sequence numbers is greater than the quantity threshold of data packet retransmissions. If yes, the next key sequence number is taken as the target sequence number and the same processing is performed. If not, the screening procedure for the target sequence number ends.

In this embodiment, by sorting based on the values of the sequence numbers, the accuracy of the target sequence number which is obtained through screening can be ensured, the data processing speed is improved, and a quick screening for the target sequence number is implemented.

In an embodiment, the data retransmission processing method further includes: adding an intermediate sequence number to the set of sequence numbers when a current sequence number of a currently received data packet is greater than a historical sequence number of a previously received data packet and there is the intermediate sequence number between the current sequence number and the historical sequence number; and deleting a current sequence number of a currently received data packet from the set of sequence numbers when the current sequence number is less than a historical sequence number of a previously received data packet.

The currently received data packet refers to a data packet that was last received and has not yet begun to be processed accordingly. The previously received data packet refers to a data packet that is received previous to the currently received data packet and has been processed accordingly.

When the data transmission is normal, the current sequence number of the currently received data packet is greater than the historical sequence number of the previously received data packet, and the current sequence number and the historical sequence number are two sequence numbers adjacent to each other, that is, there is no intermediate sequence number between the current sequence number and the historical sequence number. When the current sequence number of the currently received data packet is greater than the historical sequence number of the previously received data packet, and there is no intermediate sequence number between the current sequence number and the historical sequence number, it indicates that the respective data packets arrive in order and no packet loss phenomenon occurs.

If the current sequence number is greater than the historical sequence number and there is an intermediate sequence number between the two, it indicates that a packet loss phenomenon occurs between the current sequence number and the historical sequence number, the intermediate sequence number is the data packet where the packet loss phenomenon occurs, and it is required to request the sending end to resend the lost data packet. By adding the intermediate sequence number to the set of sequence numbers, it is easier to further determine, based on the set of sequence numbers, whether the data packet is a data packet to be retransmitted that needs a request for retransmission.

If the current sequence number of the currently received data packet is less than the historical sequence number of the previously received data packet, it indicates that the currently received data packet reaches the receiving end out of order, and the receiving end has received data packets sent after the currently received data packet. Therefore, the sequence number of the currently received data packet has been added to the set of sequence numbers. Therefore, the current sequence number needs to be deleted from the set of sequence numbers, and it is not required to request the sending end to resend the data packet.

In this embodiment, when the current sequence number is greater than the historical sequence number and there is an intermediate sequence number between the two, the sequence number of the data packet to be retransmitted is added to the set of sequence numbers. When the current sequence number is less than the historical sequence number, the sequence number of the data packet received out of order is deleted from the set of sequence numbers. It is ensured that the sequence numbers in the set of sequence numbers are all sequence numbers of data packets that the receiving end has not received, which avoids duplicate transmission of the data packet and thereby improves the accuracy of data retransmission.

In an embodiment, the adding an intermediate sequence number to the set of sequence numbers when a current sequence number of a currently received data packet is greater than a historical sequence number corresponding to a previously received data packet and there is the intermediate sequence number between the current sequence number and the historical sequence number includes: calculating a sequence number difference between a current sequence number of a currently received data packet and a historical sequence number of a previously received data packet, when the current sequence number is greater than the historical sequence number and there is an intermediate sequence number between the current sequence number and the historical sequence number; and adding the intermediate sequence number to the set of sequence numbers when the sequence number difference is less than or equal to the difference threshold.

The sequence number difference refers to a result obtained by calculating a difference between the sequence numbers. The sequence number difference is used for indicating a quantity of the intermediate sequence numbers between the current sequence number and the historical sequence number. For example, when the sequence number difference is 20, the quantity of the intermediate sequence numbers between the current sequence number and the historical sequence number is 20-1=19.

In this embodiment, by limiting the sequence number difference between the current sequence number and the historical sequence number, the intermediate sequence number is added to the set of sequence numbers only when the sequence number difference is less than or equal to the difference threshold. The quantity of the sequence numbers in the set of sequence numbers can be further controlled, thereby facilitating the reduction in the data processing volume corresponding to the sequence number deletion process for the set of sequence numbers, and improving the data processing efficiency.

In an embodiment, the data retransmission processing method further includes: performing rendering based on a data packet indicated by a current sequence number of a currently received data packet, when the current sequence number is greater than a historical sequence number of a previously received data packet and the current sequence number and the historical sequence number are continuous sequence numbers.

The continuous sequence numbers refer to two sequence numbers adjacent to each other, for example, the current sequence number is 10, and the historical sequence number of the previously received data packet is 9. Specifically, the rendering based on the data packet may be performed in the following manner: it is determined whether the data packet is a key data packet, if yes, the rendering is performed directly through data packet parsing, and if no, the rendering is performed after parsing and merging the data packet with the key data packet. A video frame data packet is used as an example. Video frame rendering is performed through packet-frame merging at real-time intervals.

Specifically, when the key data packet is a key frame data packet in audio/video data transmitted in a live broadcasting scenario, a data packet category identifier of the data packet indicated by the current sequence number of the currently received data packet is obtained when the current sequence number is greater than the historical sequence number of the previously received data packet and the current sequence number and the historical sequence number are continuous sequence numbers. When the data packet category identifier represents a key frame data packet, picture rendering is performed based on a key frame data packet indicated by the current sequence number. When the data packet category identifier represents a difference frame or a bidirectional difference frame, data superimposition is performed on the difference frame or the bidirectional difference frame and a key frame data packet, and picture rendering is performed on superimposed data.

Specifically, the live broadcasting scenario may be used for functions such as low-delay interactive live broadcasting, live broadcasting viewing, real-time recording, screen sharing, beauty effects, and stereo; and is applicable to business scenarios such as interactive video call, cross-room PK, voice radio, karaoke, small class, large class, voice chat, video chat, and online meeting. The audio/video data includes video data, or a combination of video data and audio data. The data packet category identifier includes an I-frame, a P-frame, and a B-frame. The I-frame indicates a key frame and includes a complete picture. This means that the I-frame is a complete preservation of this frame of picture, and only data of the I frame is needed when the I frame is decoded. The P-frame indicates a difference between the frame and a previous key frame (P-frame), and when a P-frame is decoded, a previously-buffered picture plus a difference defined by the frame need to be used to generate a final picture. The P-frame may alternatively be understood as a difference frame. The P-frame has no complete picture data, only data of a picture difference from the previous frame. The B-frame is a bidirectional difference frame, which records differences between the frame and a previous frame and between the frame and a following frame. To decode the B-frame, the previously buffered picture needs to be obtained, and the next picture also needs to be decoded. The final picture data is obtained for rendering by superimposing the previous and next pictures onto data of the current frame information and renders and.

In this embodiment, by rendering data packets according to continuous sequence numbers, the low-delay presentation of the data can be ensured and the response speed of the receiving end can be improved.

Further, the data retransmission processing method further includes emptying sequence numbers in the set of sequence numbers when the sequence number difference is greater than a difference threshold, and requesting a transfer of a key data packet matching the current sequence number based on the current sequence number.

The key data packet matching the current sequence number is the first key data packet that can be found by the sending end according to the sequence number based on the current sequence number.

Specifically, each data packet received by the receiving end can be parsed through the message, to obtain the sequence number of the data packet. Through sequence number difference calculation, the sequence number difference between the current sequence number of the currently received data packet and the historical sequence number of the previously received data packet is obtained. By comparing the sequence number difference with the difference threshold, when the sequence number difference is greater than the difference threshold, the receiving end empties the sequence numbers in the set of sequence numbers.

In addition, the receiving end sends a key data packet request to the sending end based on the current sequence number. The sending end may extract the current sequence number in the key data packet request. Starting from the current sequence number, the sending end may search for the first key sequence number after the current sequence number from the buffered data buffered in order based on the values of the sequence numbers, and send the key data packet indicated by the key sequence number to the receiving end. The sending end may alternatively generate a new key data packet based on the current sequence number in real time and send the generated key data packet to the receiving end.

In a specific application, an example is used in which a video packet is sent from the sending end to the receiving end. The receiving end marks a sequence number of a data packet received this time as seq1, and marks a sequence number of a data packet that previously arrives as seq2, seq1>seq2, seq1−seq2 is a void size, and seq increases continuously. A normal network packet loss seq (sequence number) void size is within a certain range. There are some abnormal network scenarios. For example, when a user enters an elevator, a normal network becomes abnormal, and when the user comes out from the elevator, the network recovers. During a time period when the user is in the elevator, the network is mostly abnormal, and packets sent by the sending end are mostly lost. When the user comes out from the elevator, seq1 which is the latest recovers, and there is a relatively large jump compared with seq2 which is previous. For (seq1−seq2)>max_void, it may be considered that the network is abnormal in a time period from seq2 to seq1. In this case, a set of sequence numbers NACK List may be cleared, and the void between seq2 and seq1 is not required to be inserted into the NACK List. The receiving end directly sends a picture loss indication (PYI) request, all the previous data is discarded, and the sending end is caused to perform sending from a latest key frame (the sending end may generate a key frame in real time according to the request). Specifically, the value of the difference threshold max_void may be set according to requirements, for example, 600, 800, 1000, or the like, and the difference threshold may be converted into a network abnormality duration. An example is used in which the difference threshold is 800. The video average code rate is 2 Mbps. 1) Calculation is performed by setting a single seq in the NACK List to 1500 bytes (the maximum MTU of a metropolitan area network router is 1500), that is, there are 250 KB/1500=170 data packets per second. Therefore, the difference threshold of 800 is converted into a network abnormality duration of 5 seconds.

In this embodiment, the sequence number difference threshold between the current sequence number of the currently received data packet and the historical sequence number of the previously received data packet is set, and the sequence numbers in the set of sequence numbers are emptied when the sequence number difference between the current sequence number and the historical sequence number is greater than the difference threshold. Thereby, the situation that a large quantity of sequence numbers are added to the set of sequence numbers when the network is abnormal can be avoided, resulting in a large quantity of data retransmission requests being sent to the sending end. A problem in which an intermittent network storm occurs is resolved, the intermittent network storm being resulted from a large quantity of retransmission requests that need to be processed at a same moment when network jitter and packet loss are very serious. Stability in the data transmission process is ensured.

In an embodiment, the data retransmission processing method further includes performing smoothing processing on historical delay data corresponding to historical transmission data, to obtain reference delay data; and determining the retransmission period based on the reference delay data, a duration corresponding to the retransmission period being greater than or equal to a duration corresponding to the reference delay data.

The historical transmission data refers to the data that has been successfully transmitted. The historical delay data may be round-trip time (RTT) respectively corresponding to the historical transmission data packets. The round-trip time refers to the amount of time required for data transmission from one end of the network to the other. Normally, the delay includes four parts: sending delay, propagation delay, queuing delay, and processing delay. "Smoothed" RTT (SRTT) may be obtained by smoothing the RTT, and the SRTT is to consider historical RTT as much as possible while keeping the calculation simple. Specifically, $SRTT=\alpha*SRTT+(1-\alpha)*RTT$, where $\alpha$ is a weight coefficient and may be taken in a range of 0.6 to 0.7. The SRTT used in the calculation refers to a result obtained by a previous calculation.

Based on the duration corresponding to the reference delay data, a retransmission period is obtained which has a duration greater than or equal to the duration corresponding to the reference delay data. Because the reference delay data is dynamically changed, the retransmission period is dynamically updated based on the reference delay data.

Specifically, a SRTT transport protocol stack calculates the SRTT in real time and dynamically adjusts the retransmission period according to the real-time calculation result of the SRTT, such as resizing once every 30 seconds.

In this embodiment, based on the real-time data transmission delay data, the retransmission period can be dynamically updated, so that the retransmission period matches the real-time network state, thereby adjusting the data processing volume of each retransmission period and implementing balanced data processing.

In an embodiment, the data retransmission processing method further includes: recording a quantity of times of retransmission requests corresponding to each data packet to be retransmitted; and deleting the sequence numbers of the data packets to be retransmitted from the set of sequence numbers when the quantity of times of retransmission requests corresponding to the data packets to be retransmitted is greater than a threshold of quantity of times of requests.

The threshold of quantity of times of requests is a maximum quantity of times of requests preset for a same data packet to be retransmitted. In each retransmission period, the sending end initiates a retransmission request to the sending end based on the data packet to be retransmitted indicated by each sequence number remaining in the set of sequence numbers. Specifically, in each retransmission period, a retransmission request is initiated for seq packets remaining in the set of sequence numbers, and a quantity of times of retransmission requests retries+1 of the seq is marked and recorded. When retries>MaxRetries, the seq is deleted from the set of sequence numbers. The value of the threshold of quantity of times of requests MaxRetries may be set according to the transmission scenario. For example, when a maximum real-time communication (RTC) delay intends to be MaxRTCDelay according to the application scenario, MaxRetries=MaxRTCDelay/SRTT+1, which may be proactively set according to the scenario. The greater the MaxRetries, the greater the quantity of the sequence numbers in the set of sequence numbers, the more sequence numbers need to be deleted for the set of sequence numbers, resulting in an increase in the data processing volume. If the quantity of the sequence numbers in the set of sequence numbers is not controlled, an end-to-end delay increases.

In this embodiment, by controlling the quantity of times of retransmission requests of each data packet to be retransmitted, it is effectively avoided that excessive retransmission requests for a same data packet to be retransmitted are sent, an effective control over the quantity of the sequence numbers in the set of sequence numbers is implemented, and the data processing efficiency is improved.

In an embodiment, the determining, based on a data packet loss rate within a retransmission period, a quantity threshold of data packet retransmissions within the retransmission period includes:

determining, when the data packet loss rate within the retransmission period is greater than a packet loss rate threshold, the quantity threshold of data packet retransmissions within the retransmission period based on the data packet loss rate within the retransmission period.

The packet loss rate threshold refers to a maximum allowed packet loss rate. The packet loss rate threshold may be a fixed value that is preset, or may be adjusted based on the specific application scenario, such as real-time adjustment or periodic adjustment. In a specific application, the packet loss rate threshold may be set to 10%. When the receiving end detects that the data packet loss rate within the retransmission period reaches 10% or more, based on the data packet loss rate within the retransmission period, the quantity threshold of data packet retransmissions within the retransmission period is determined, and the set of sequence numbers formed by the respective sequence numbers of the data packets to be retransmitted within the retransmission period is obtained. The respective key sequence numbers of the key data packets matching the set of sequence numbers are determined. The target sequence number is obtained through screening from the key sequence numbers, and the sequence numbers less than or equal to the target sequence number are deleted from the set of sequence numbers, to maximize the quantity of the sequence numbers remaining in the set of sequence numbers, and cause the quantity of the remaining sequence numbers to be less than or equal to the quantity threshold of data packet retransmissions. The retransmission of the data packets to be retransmitted that are indicated by the sequence numbers remaining in the set of sequence numbers is requested.

In this embodiment, a retransmission of data packets is requested only when the data packet loss rate within the retransmission period is greater than the packet loss rate threshold, the data packets that request a retransmission being data packets to be retransmitted that are indicated by the sequence numbers remaining in the set of sequence numbers. A manner is adopted in which the packet loss rate threshold is limited to determine whether to trigger the retransmission request. The foregoing manner limits the specific trigger scenario, avoids that the data packet retransmission processing is performed as long as a data packet to be retransmitted occurs, implements an accurate scenario limitation, and avoids the waste of data processing resources.

Further, the data retransmission processing method further includes: requesting a retransmission of the data packets to be retransmitted within the retransmission period when the data packet loss rate within the retransmission period is less than or equal to the packet loss rate threshold.

In this embodiment, a retransmission of the data packets to be retransmitted within the retransmission period is directly requested only when the data packet loss rate within the retransmission period is less than or equal to the packet loss rate threshold. Thereby, a complicated processing process is avoided, and when the data packet loss rate is relatively small, it is conducive to improving the data processing efficiency.

In an embodiment, the determining respective key sequence numbers of key data packets matching the set of sequence numbers includes: determining respective key sequence numbers of key data packets matching the set of sequence numbers when a quantity of the data packets to be retransmitted within the retransmission period is greater than the quantity threshold of data packet retransmissions within the retransmission period.

Specifically, based on the data packet loss rate within the retransmission period, the quantity threshold of data packet retransmissions within the retransmission period is determined, and the set of sequence numbers formed by the respective sequence numbers of the data packets to be retransmitted within the retransmission period is obtained. When the quantity of the data packets to be retransmitted within the retransmission period is greater than the quantity threshold of data packet retransmissions within the retransmission period, the respective key sequence numbers of the key data packets matching the set of sequence numbers are determined. The target sequence number is obtained through screening from the key sequence numbers, and the sequence numbers less than or equal to the target sequence number are deleted from the set of sequence numbers, to maximize the quantity of the sequence numbers remaining in the set of sequence numbers, and cause the quantity of the remaining sequence numbers to be less than or equal to the quantity threshold of data packet retransmissions. The retransmission of the data packets to be retransmitted that are indicated by the sequence numbers remaining in the set of sequence numbers is requested.

In this embodiment, a retransmission of data packets is requested only when the quantity of the data packets to be retransmitted within the retransmission period is greater than the quantity threshold of data packet retransmissions within the retransmission period, the data packets that request a retransmission being data packets to be retransmitted that are indicated by the sequence numbers remaining in the set of sequence numbers. A manner is adopted in which it is determined whether to trigger the retransmission request according to the quantity of the data packets to be retransmitted. The foregoing manner limits the specific trigger condition scenario for triggering the retransmission request, avoids that the data packet retransmission processing is performed as long as a data packet to be retransmitted occurs, implements an accurate scenario limitation, and avoids the waste of data processing resources.

In an embodiment, the data retransmission processing method further includes: requesting a retransmission of the data packets to be retransmitted within the retransmission period when the quantity of the data packets to be retransmitted within the retransmission period is less than or equal to the quantity threshold of data packet retransmissions within the retransmission period.

In this embodiment, a retransmission of the data packets to be retransmitted within the retransmission period is directly requested only when the quantity of the data packets to be retransmitted within the retransmission period is less than or equal to the quantity threshold of data packet retransmissions within the retransmission period. Thereby, a complicated processing process is avoided, and when the quantity of the data packets to be retransmitted within the retransmission period is relatively small, it is conducive to improving the data processing efficiency.

In an embodiment, a retransmission of the data packets to be retransmitted within the retransmission period is requested when the data packet loss rate within the retransmission period is less than or equal to the packet loss rate threshold. When the data packet loss rate within the retransmission period is greater than the packet loss rate threshold, based on the data packet loss rate within the retransmission period, the quantity threshold of data packet retransmissions within the retransmission period is determined, and the set of sequence numbers formed by the respective sequence numbers of the data packets to be retransmitted within the retransmission period is obtained. requesting a retransmission of the data packets to be retransmitted within the retransmission period when the quantity of the data packets to be retransmitted within the retransmission period is less than or equal to the quantity threshold of data packet retransmissions within the retransmission period. When the quantity of the data packets to be retransmitted within the retransmission period is greater than the quantity threshold of data packet retransmissions within the retransmission period, the respective key sequence numbers of the key data packets matching the set of sequence numbers are determined. The target sequence number is obtained through screening from the key sequence numbers, and the sequence numbers less than or equal to the target sequence number are deleted from the set of sequence numbers, to maximize the quantity of the sequence numbers remaining in the set of sequence numbers, and cause the quantity of the remaining sequence numbers to be less than or equal to the quantity threshold of data packet retransmissions. The retransmission of the data packets to be retransmitted that are indicated by the sequence numbers remaining in the set of sequence numbers is requested.

In this embodiment, a retransmission of data packets is requested only when the data packet loss rate within the retransmission period is greater than the packet loss rate threshold and the quantity of the data packets to be retransmitted within the retransmission period is greater than the quantity threshold of data packet retransmissions within the retransmission period, the data packets that request a retransmission being data packets to be retransmitted that are indicated by the sequence numbers remaining in the set of sequence numbers. By limiting the specific trigger condition of the retransmission request to a condition that meets the two threshold conditions at the same time, the trigger threshold of the retransmission request for the foregoing data packets to be retransmitted is further raised, and the situation in which the retransmission request is frequently triggered can be avoided and waste of data processing resources can be reduced.

Figure 6:
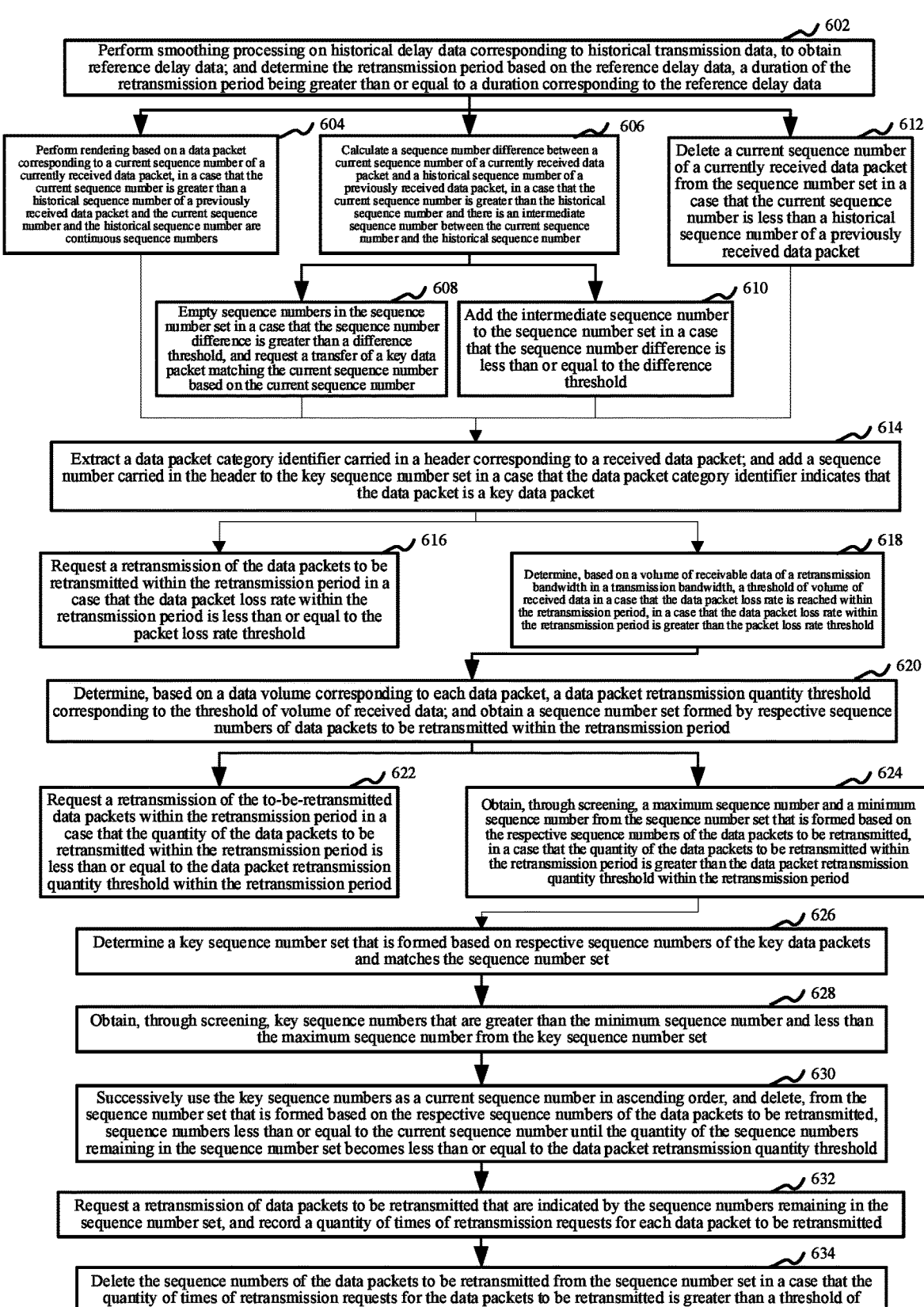
FIG. 6 is a schematic flowchart of a data retransmission processing method according to another embodiment.

In an embodiment, as shown in FIG. 6, a data retransmission processing method is provided, including:

Step 602: Perform smoothing processing on historical delay data corresponding to historical transmission data, to obtain reference delay data; and determine the retransmission period based on the reference delay data, a duration of the retransmission period being greater than or equal to a duration corresponding to the reference delay data.

Step 604: Perform rendering based on a data packet indicated by a current sequence number of a currently received data packet, when the current sequence number is greater than a historical sequence number of a previously received data packet and the current sequence number and the historical sequence number are continuous sequence numbers.

Step 606: Calculate a sequence number difference between a current sequence number of a currently received data packet and a historical sequence number of a previously received data packet, when the current sequence number is greater than the historical sequence number and there is an intermediate sequence number between the current sequence number and the historical sequence number.

Step 608: Empty sequence numbers in the set of sequence numbers when the sequence number difference is greater than a difference threshold, and request a transfer of a key data packet matching the current sequence number based on the current sequence number.

Step 610: Add the intermediate sequence number to the set of sequence numbers when the sequence number difference is less than or equal to the difference threshold.

Step 612: Delete a current sequence number of a currently received data packet from the set of sequence numbers when the current sequence number is less than a historical sequence number of a previously received data packet.

Step 614: Extract a data packet category identifier carried in a header corresponding to a received data packet; and add a sequence number carried in the header to the key set of sequence numbers when the data packet category identifier indicates that the data packet is a key data packet.

Step 616: Request a retransmission of the data packets to be retransmitted within the retransmission period when the data packet loss rate within the retransmission period is less than or equal to the packet loss rate threshold.

Step 618: Determine, based on a volume of receivable data of a retransmission bandwidth in a transmission bandwidth, a threshold of volume of received data when the data packet loss rate is reached within the retransmission period, when the data packet loss rate within the retransmission period is greater than the packet loss rate threshold.

Step 620: Determine, based on a data volume of each data packet, a quantity threshold of data packet retransmissions corresponding to the threshold of volume of received data; and obtain a set of sequence numbers formed by respective sequence numbers of data packets to be retransmitted within the retransmission period.

Step 622: Request a retransmission of the data packets to be retransmitted within the retransmission period when the quantity of the data packets to be retransmitted within the retransmission period is less than or equal to the quantity threshold of data packet retransmissions within the retransmission period.

Step 624: Obtain, through screening, a maximum sequence number and a minimum sequence number from the set of sequence numbers, when the quantity of the data packets to be retransmitted within the retransmission period is greater than the quantity threshold of data packet retransmissions within the retransmission period.

Step 626: Determine a key set of sequence numbers that is formed based on respective sequence numbers of the key data packets and matches the set of sequence numbers.

Step 628: Obtain, through screening, key sequence numbers that are greater than the minimum sequence number and less than the maximum sequence number from the key set of sequence numbers.

Step 630: Successively use the key sequence numbers as a current sequence number in ascending order, and delete, from the set of sequence numbers that is formed based on the respective sequence numbers of the data packets to be retransmitted, sequence numbers less than or equal to the current sequence number until the quantity of the sequence numbers remaining in the set of sequence numbers becomes less than or equal to the quantity threshold of data packet retransmissions.

Step 632: Request a retransmission of data packets to be retransmitted that are indicated by the sequence numbers remaining in the set of sequence numbers, and record a quantity of times of retransmission requests for each data packet to be retransmitted.

Step 634: Delete the sequence numbers of the data packets to be retransmitted from the set of sequence numbers when the quantity of times of retransmission requests for the data packets to be retransmitted is greater than a threshold of quantity of times of requests.

This application further provides an application scenario, and the application scenario applies the foregoing data retransmission processing method. Specifically, the application of the data retransmission processing method in the application scenario is as follows.

One problem of the existing NACK solutions is that in a case of strong network jitter and packet loss, many NACK retransmission requests may be received at a same moment. The sending end instantaneously puts these retransmission requests into a pacer for retransmission, and the pacer queue instantaneously becomes large, which may easily cause an intermittent network storm, cause serious network congestion, and aggravate the network jitter. There is a lack of corresponding congestion control strategies. Even if the network of the user is good and no network storm occurs, the delay of the pacer increases because the sending end instantaneously puts these retransmission requests into a pacer for retransmission. If a jitter buffer of the receiving end is a static control algorithm, the buffer size can only be fixed and set as large as possible. When the network jitter is large, the packet loss rate is high, and when the network jitter is small, the delay is large.

The data retransmission processing method proposed in this solution may be implemented by the NACK retransmission code rate packet loss rate controller. A specific application scenario may be a low-delay live broadcasting, that is, the solution may be applied to a low-delay live broadcasting. This solution briefly describes the transmission with an RTP/RTCP/WebRTC transport protocol format as the reference. The solution may be based on the RTP/RTCP/WebRTC transport protocol format or a custom transport protocol format, which is not limited in the actual solution application.

The RTP protocol corresponding to the real-time transport protocol (RTP) describes a standard data packet format for the transmission of audio and video on the Internet in detail. The RTP protocol is initially designed as a multicast protocol, but is later used in many unicast applications. The RTP protocol is often used in a streaming media system (with the RTSP protocol), a video conference, and a Push to Talk system (with the H. 323 or the SIP), causing the RTP protocol to become the technological foundation of the IP phone industry. The RTP protocol is used with the RTP control protocol (RTCP), and is created on the UDP protocol.

The RTCP (real-time transport control protocol, or RTP control protocol, or briefly referred to as RTCP) is a sister protocol of the real-time transport protocol (RTP). The RTCP is defined by the RFC 3550 (replacing the obsolete RFC 1889). The RTP uses an even UDP port; and the RTCP uses the next port of the port of the RTP, which is an odd port. The RTCP and the RTP work together, RTP implements a data transmission, and the RTCP is responsible for delivering a control packet to everyone in the phone. Its main function is to provide feedback on the quality of services that the RTP is providing.

The web real-time communication (WebRTC) is an application programming interface (API) that supports a real-time voice conversation or video conversation using a web browser. The WebRTC is incorporated into the W3C recommendation standard of the world wide web consortium with the support of Google, Mozilla, and Opera. The WebRTC provides core technologies of a video conference, including functions such as audio/video collection, encoding and decoding, network transmission, and display. The WebRTC further supports cross-platform: windows, linux, mac, and android.

In the RTC and low-delay live broadcasting products, forward error correction (FEC) and packet loss retransmission (NACK) are important means of resisting network errors. The FEC adds a redundant error correction code to the data packet at the sending end and sends the error correction code along with the data packet to the receiving end; and the receiving end checks and corrects the data according to the error correction code. The NACK sends the NACK message to the sending end after the receiving end detects a data packet loss; The sending end finds the data packet to be retransmitted in the sending buffer according to the sequence number in the NACK message and resends the data packet to be retransmitted to the receiving end. The NACK requires a support of the sending buffer of the sending end, and the RFC5104 defines the format of NACK data packets. This solution analyzes in depth sequence number characteristics (seq characteristics) of RTP data packets in a scenario in which the network is abnormal in the RTC and low-delay live broadcasting scenarios, and designs a NACK retransmission code rate packet loss rate controller when optimizing the network abnormality in combination with a receiver estimated maximum bitrate (REMB), a loss rate (packet loss rate), SRTT, and NACK packet loss retransmission list, to optimize the fast recovery optimization solution when a low-delay live broadcasting network is abnormal. This solution is well applied in business products such as Tencent cloud video cloud live event broadcasting and cloud gaming, and is well applied in apps such as Kwai, TikTok, YY, DouYu, Bilibili, Caiji, and Unreal Engine application.

The live event broadcasting (LEB) is an extension of standard live broadcasting under an ultra-low-delay broadcasting scenario, which has a lower delay than a conventional live broadcasting protocol, and provides a viewer with an ultimate millisecond-level live broadcasting viewing experience. The LEB can meet some specific scenario needs that require better delay performance, for example, online education, sports event live broadcasting, online question answering, and the like.

In a transmission layer, the UDP is mostly used whether a mainstream solution of the low-delay live broadcasting transmission is based on the RTP/RTCP/WebRTC transport protocol format or the custom transport protocol format. Resolving on network abnormality (network BDP, that is, the product of bandwidth and delay) and jitter, network connection recovery, and network switching (such as switching from 4G/5G to WiFi, and switching from WiFi to 4G/5G) may cause data packet delay or early arrival, data packet disorder, packet loss, and the like. The FEC (forward error correction) and the packet loss retransmission (NACK) are important means of resisting network errors. To resolve the jitter problem, a jitter buffer (audio/video jitter buffer) is used. The jitter buffer is a buffer for storing RTP data packets, and may sort the RTP data packets. When there are discontinuous sequence numbers of the RTP data packets in the jitter buffer, the NACK is used to request the sending end for retransmission.

Figure 7:
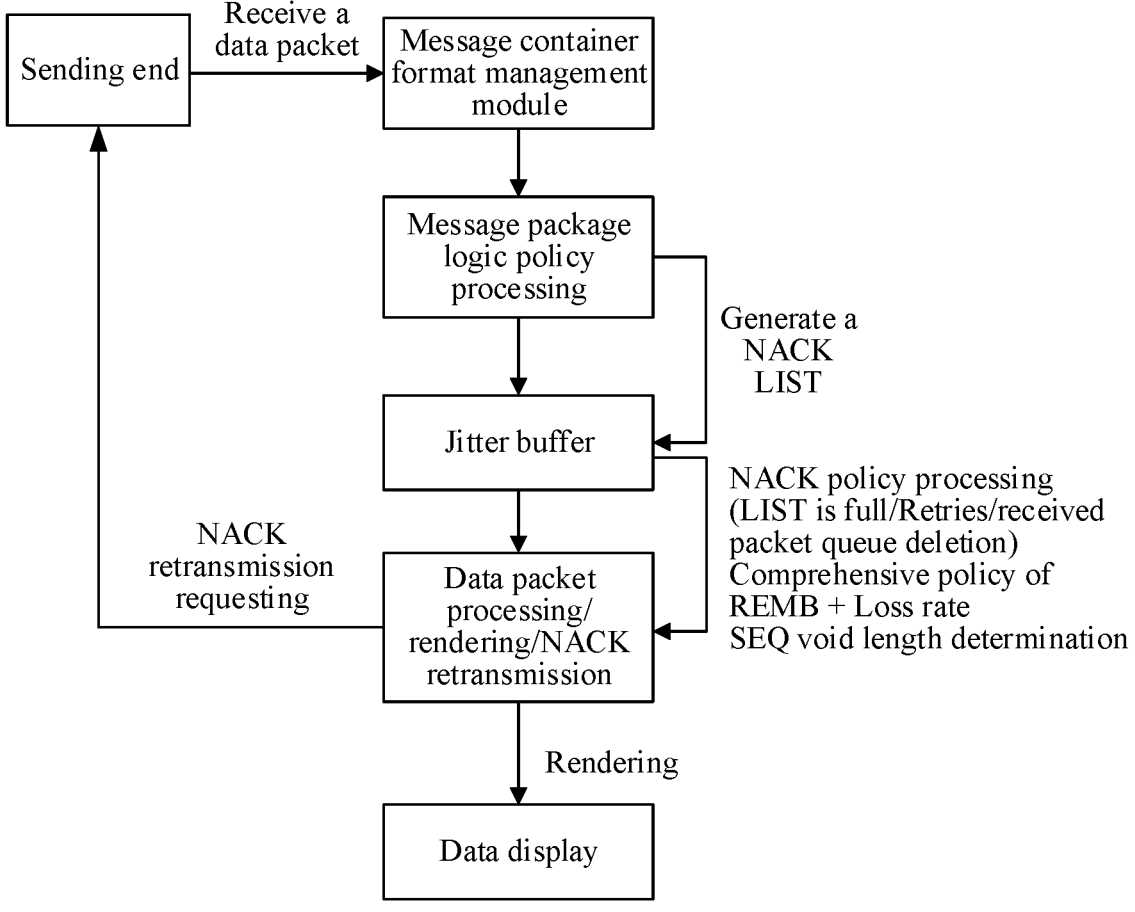
FIG. 7 is a schematic processing flowchart of a data retransmission processing method according to an embodiment.

As shown in FIG. 7, first, a message container format management module receives an RTP/RTCP data packet, and then performs transmission format parsing, audio/video container format parsing, and validity detection.

A message package logic policy is executed when the format parsing is correct and valid. A sequence number of a lost RTP data packet is stored in a set NACK List. For a data packet coming from the RTP module this time, a sequence number of the data packet is obtained from the header in the message, and the sequence number of the data packet is marked as seq1. A sequence number of a data packet that previously arrives is marked as seq2. The seq number of the RTP header is only 2 bytes, a maximum value is 65535, and a wraparound occurs. In this solution, it is assumed that the seq wraparound is well processed, and it is considered that all the seq numbers increase continuously.

If seq1>seq2, it indicates that seq1 arrives in order. A data packet within an interval of (seq2, seq1) is marked as a lost state and is stored in the NACK List set. Key frame determination is performed on a video frame packet corresponding to a video nalu typeseq1 through an RTP FU header. If the received video frame packet corresponding to seq1 is a key frame, the current seq1 number is stored into a NACK KeyFrame List.

The lost state here is temporary. If seq3<seq1 when the next data packet arrives, it indicates that the data packet arrives out of order, and a sequence number of seq3 in the NACK List is deleted. When the NACK List set is updated, a REMB and a packet loss rate (loss rate, briefly referred to as lr) within a NACK policy retransmission period are combined for consideration.

If lr≤10%, a NACK List request is sent normally.

If lr>10%, a NACK List length of the NACK policy retransmission period is obtained, that is, NL. The quantity threshold of data packet retransmissions within the NACK policy retransmission period is determined as $max\_send\_retries\_nack=(0.2*REMB\ (byte))*(1-0.8*lr)/1500$, where calculation is performed by setting a single seq in the NACK List to 1500 bytes (the maximum MTU of a metropolitan area network router is 1500).

If NL<max_send_retries_nack, all the NACK List requests are sent normally.

Otherwise, respective key frame positions are found according to the seq value from the NACK List. These key frame positions and each seq before them are deleted, and then NL after the deletion processing is recalculated. The deletion processing and the recalculation processing are repeated until NL<max_send_retries_nack.

According to the received RTP packets, if the sequence numbers of the received RTP packets are continuous, the jitter buffer performs packet-frame merging and performs rendering at real-time intervals. If there are discontinuous sequence numbers among the sequence numbers of the RTP data packets, the jitter buffer waits for a certain period of time, to wait for the retransmission by the sending end and the recovery of seq packets lost in the void. A normal network packet loss seq void size is seq1−seq2, which is within a certain range. There are some abnormal network scenarios. For example, when a user enters an elevator, a normal network becomes abnormal, and when the user comes out from the elevator, the network recovers. During a time period when the user is in the elevator, the network is mostly abnormal, and packets sent by the sending end are mostly lost. When the user comes out from the elevator, seq1 which is the latest recovers, and there is a relatively large jump compared with seq2 which is previous. For (seq1−seq2)>max_void, it may be considered that the network is abnormal in a time period from seq2 to seq1. In this case, the NACK List may be cleared, and the void between seq2 and seq1 is not required to be inserted into the NACK List. A client directly sends a PYI request, all the previous data which is old is discarded, and the sending end is caused to perform sending from a latest key frame.

The NACK List is regularly detected based on the retransmission period, and the retransmission period may be dynamically set to the latest SRTT. After the delay is more than one SRTT, the NACK List is checked, a retransmission request is initiated for the lost seq packet in the NACK List, and a quantity of times of retransmission requests retries+1 of the seq is marked and recorded. When retries>MaxRetries, the seq is deleted from the NACK List.

Figure 8:
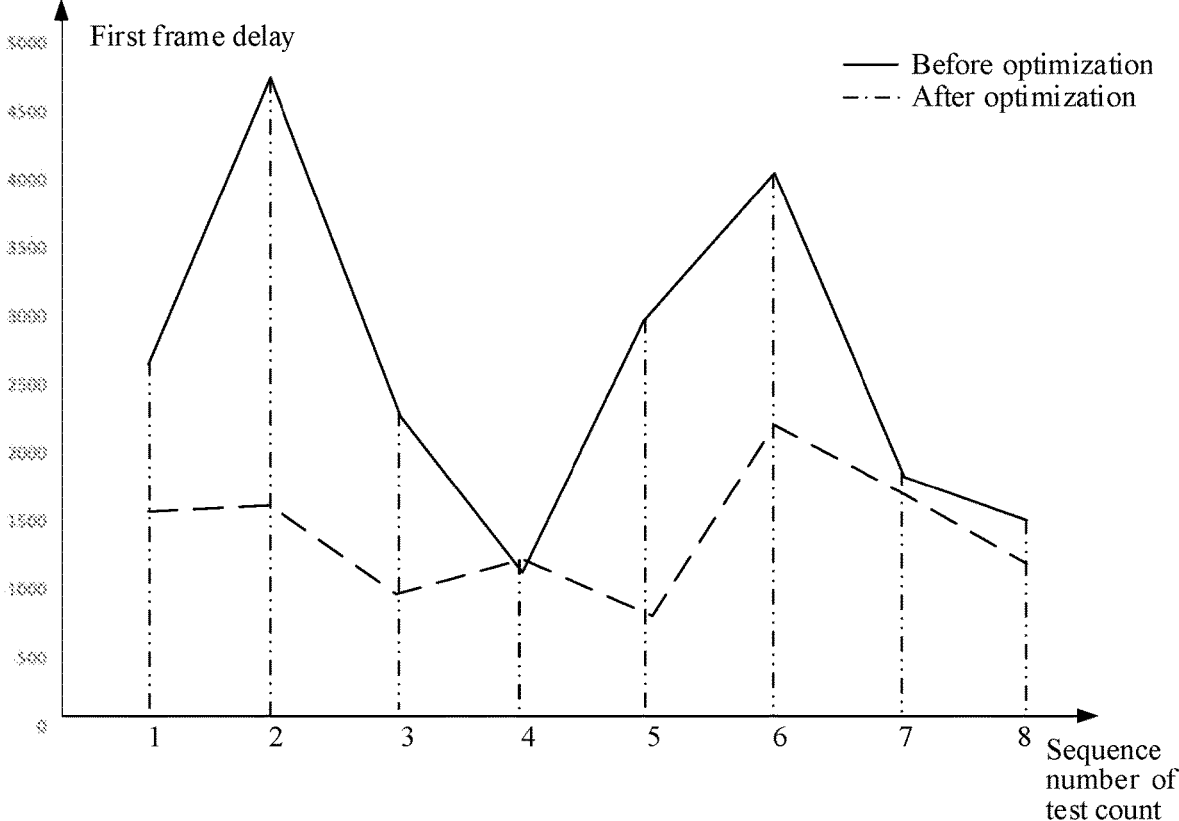
FIG. 8 is a schematic diagram of a comparison between first frame delays before and after optimization using a data retransmission processing method according to an embodiment.

The average comprehensive first frame delay of the NACK retransmission code rate packet loss rate controller using the foregoing data retransmission processing method has a reduction of more than 80% compared with that before optimization. As shown in FIG. 8, a horizontal coordinate is a sequence number of a test count, and a vertical coordinate is a first frame delay of low-delay live broadcasting in a weak network. A problem in which an intermittent network storm occurs is resolved, the intermittent network storm occurring because many NACK retransmission requests may be received at a same moment in a case of strong network jitter and packet loss.

Although the steps in the flowcharts of FIG. 2 and FIG. 6 are sequentially displayed in accordance with instructions of arrows, these steps are not necessarily performed sequentially in the order indicated by the arrows. Unless otherwise clearly specified in this specification, the steps are performed without any strict sequence limit, and may be performed in other sequences. In addition, at least some steps in FIG. 2 and FIG. 6 may include multiple steps or multiple stages. The steps or the stages are not necessarily performed at the same moment, but may be performed at different moments. The steps or the stages are not necessarily performed in sequence, but may be performed in turn or alternately with another step or at least some of steps or stages of another step.

Figure 9:
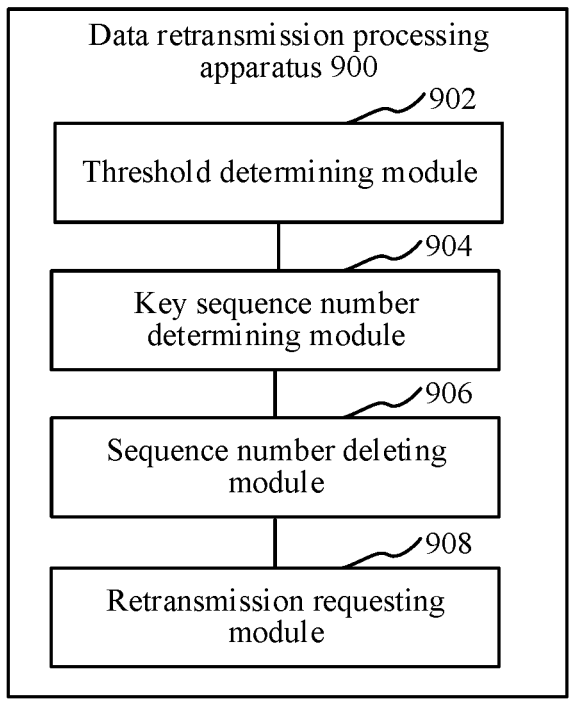
FIG. 9 is a structural block diagram of a data retransmission processing apparatus according to an embodiment.

In an embodiment, as shown in FIG. 9, a data retransmission processing apparatus 900 is provided. The apparatus may adopt a software module, a hardware module, or a combination of the two as a part of the computer device. The apparatus specifically includes: a threshold determining module 902, a key sequence number determining module 904, a sequence number deleting module 906, and a retransmission requesting module 908.

The threshold determining module 902 is configured to determine, based on a data packet loss rate within a retransmission period, a quantity threshold of data packet retransmissions within the retransmission period, and obtain a set of sequence numbers formed by respective sequence numbers of data packets to be retransmitted within the retransmission period.

The key sequence number determining module 904 is configured to determine respective key sequence numbers of key data packets matching the set of sequence numbers.

The sequence number deleting module 906 is configured to obtain, through screening, a target sequence number from the key sequence numbers, and delete sequence numbers less than or equal to the target sequence number from the set of sequence numbers, to maximize a quantity of sequence numbers remaining in the set of sequence numbers, and cause the quantity of the remaining sequence numbers to be less than or equal to the quantity threshold of data packet retransmissions.

The retransmission requesting module 908 is configured to request a retransmission of data packets to be retransmitted that are indicated by the sequence numbers remaining in the set of sequence numbers.

In an embodiment, the threshold determining module includes a module for determining a threshold of volume of received data, and a module for quantity threshold of data packet retransmissions.

The module for determining a threshold of volume of received data is configured to determine, based on a volume of receivable data of a retransmission bandwidth in a transmission bandwidth, a corresponding threshold of volume of received data when the data packet loss rate is reached within the retransmission period.

The module for quantity threshold of data packet retransmissions is configured to determine, based on a data volume of each data packet, a quantity threshold of data packet retransmissions corresponding to the threshold of volume of received data.

In an embodiment, the key sequence number determining module includes a sequence number screening module, a key set of sequence numbers determining module, and a key sequence number screening module.

The sequence number screening module is configured to obtain, through screening, a maximum sequence number and a minimum sequence number from the set of sequence numbers, and obtain a key set of sequence numbers that is formed based on respective sequence numbers of the key data packets and matches the set of sequence numbers.

The key sequence number screening module is configured to obtain, through screening, key sequence numbers that are greater than the minimum sequence number and less than the maximum sequence number from the key set of sequence numbers.

In an embodiment, the data retransmission processing apparatus further includes a key set of sequence numbers controlling module. The key set of sequence numbers controlling module is configured to: extract a data packet category identifier carried in a header corresponding to a received data packet; and add a sequence number carried in the header to the key set of sequence numbers when the data packet category identifier indicates that the data packet is a key data packet.

In an embodiment, the sequence number deleting module is further configured to successively use the key sequence numbers as a current sequence number in ascending order, and delete, from the set of sequence numbers that is formed based on the respective sequence numbers of the data packets to be retransmitted, sequence numbers less than or equal to the current sequence number until the quantity of the sequence numbers remaining in the set of sequence numbers becomes less than or equal to the quantity threshold of data packet retransmissions.

In an embodiment, the data retransmission processing apparatus further includes an intermediate sequence number adding module and a current sequence number deleting module.

The intermediate sequence number adding module is configured to add an intermediate sequence number to the set of sequence numbers when a current sequence number of a currently received data packet is greater than a historical sequence number of a previously received data packet and there is the intermediate sequence number between the current sequence number and the historical sequence number.

The current sequence number deleting module is configured to delete a current sequence number of a currently received data packet from the set of sequence numbers when the current sequence number is less than a historical sequence number of a previously received data packet.

In an embodiment, the data retransmission processing apparatus further includes a sequence number difference calculating module, a first sequence number difference comparing module, and a second sequence number difference comparing module.

The sequence number difference calculating module is configured to calculate a sequence number difference between a current sequence number of a currently received data packet and a historical sequence number of a previously received data packet, when the current sequence number is greater than the historical sequence number and there is an intermediate sequence number between the current sequence number and the historical sequence number; and The first sequence number difference comparing module is configured to empty sequence numbers in the set of sequence numbers when the sequence number difference is greater than a difference threshold, and request a transfer of a key data packet matching the current sequence number based on the current sequence number.

The second sequence number difference comparing module is configured to add the intermediate sequence number to the set of sequence numbers when the sequence number difference is less than or equal to the difference threshold.

In an embodiment, the key data packet is a key frame data packet in audio/video data transmitted in a live broadcasting scenario, and the data retransmission processing apparatus further includes a rending module. The rending module is configured to obtain a data packet category identifier of a data packet indicated by a current sequence number of a currently received data packet, when the current sequence number is greater than a historical sequence number of a previously received data packet and the current sequence number and the historical sequence number are continuous sequence numbers. When the data packet category identifier represents a key frame data packet, picture rendering is performed based on a key frame data packet indicated by the current sequence number. When the data packet category identifier represents a difference frame or a bidirectional difference frame, data superimposition is performed on the difference frame or the bidirectional difference frame and a key frame data packet, and picture rendering is performed on superimposed data.

In an embodiment, the data retransmission processing apparatus further includes a retransmission period determining module. The retransmission period determining module is configured to: perform smoothing processing on historical delay data corresponding to historical transmission data, to obtain reference delay data; and determine the retransmission period based on the reference delay data, a duration corresponding to the retransmission period being greater than or equal to a duration corresponding to the reference delay data.

In an embodiment, the sequence number deleting module is further configured to: record a quantity of times of retransmission requests for each data packet to be retransmitted; and delete the sequence numbers of the data packets to be retransmitted from the set of sequence numbers when the quantity of times of retransmission requests for the data packets to be retransmitted is greater than a threshold of quantity of times of requests.

In an embodiment, the threshold determining module is further configured to determine, when the data packet loss rate within the retransmission period is greater than a packet loss rate threshold, the quantity threshold of data packet retransmissions within the retransmission period based on the data packet loss rate within the retransmission period. The retransmission requesting module is further configured to request a retransmission of the data packets to be retransmitted within the retransmission period when the data packet loss rate within the retransmission period is less than or equal to the packet loss rate threshold.

In an embodiment, the key sequence number determining module is further configured to determine respective key sequence numbers of key data packets matching the set of sequence numbers when a quantity of the data packets to be retransmitted within the retransmission period is greater than the quantity threshold of data packet retransmissions within the retransmission period. The retransmission requesting module is further configured to request a retransmission of the data packets to be retransmitted within the retransmission period when the quantity of the data packets to be retransmitted within the retransmission period is less than or equal to the quantity threshold of data packet retransmissions within the retransmission period.

For specific embodiments of the data retransmission processing apparatus, references may be made to the embodiments for the data retransmission processing method described above. Details are not described herein again. The modules in the foregoing data retransmission processing apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 10. The computer device includes a processor, a memory, a communication interface, a display screen, and an input apparatus that are connected by using a system bus. The processor of the terminal is configured to provide computing and control capabilities. The memory of the terminal includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless manner may be implemented through WiFi, a carrier network, near field communication (NFC) or other technologies. The computer-readable instructions are executed by the processor to implement a data retransmission processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 10:
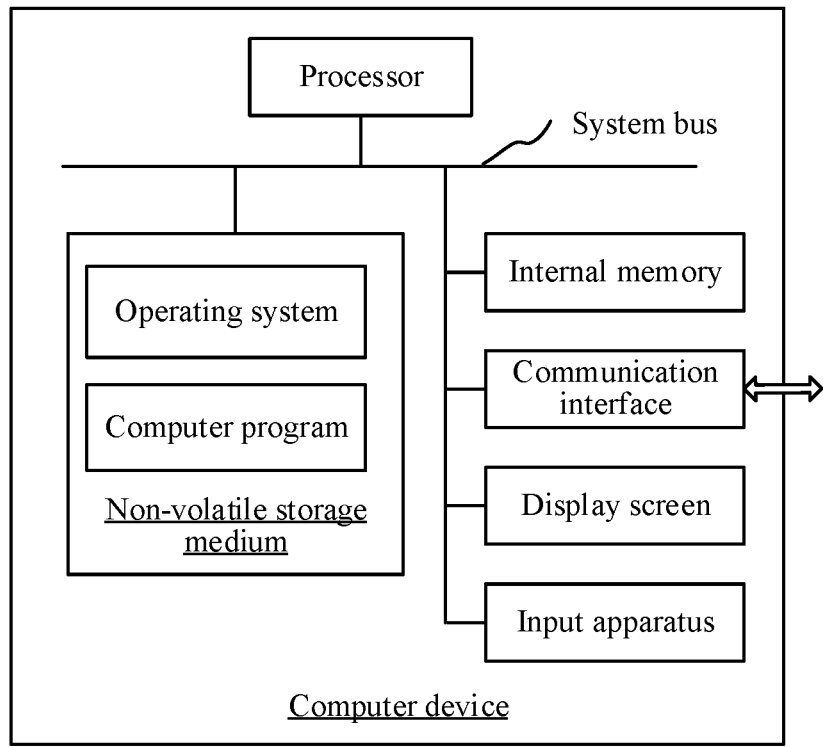
FIG. 10 is a diagram of an internal structure of a computer device according to an embodiment.

A person skilled in the art may understand that the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer program product or a computer program is provided. The computer program product or the computer program includes computer-readable instructions, and the computer instructions are stored in a computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in multiple forms, such as a static random access memory (SRAM) or a dynamic random access memory (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only show several implementations of this application and are described in detail, but they are not to be construed as a limit to the patent scope of this application. A person of ordinary skill in the art may make various changes and improvements without departing from the ideas of this application, which shall all fall within the protection scope of this application. Therefore, the protection scope of this patent application is subject to the protection scope of the appended claims.

What is claimed is:

1. A data retransmission processing method, performed by a computer device, the method comprising:
determining a quantity threshold of data packet retransmissions within a retransmission period based on a data packet loss rate within the retransmission period, and obtaining a set of sequence numbers including respective sequence numbers of data packets to be retransmitted within the retransmission period;
determining respective key sequence numbers of key data packets matching the set of sequence numbers;
selecting a target sequence number from the key sequence numbers, and deleting sequence numbers less than or equal to the target sequence number from the set of sequence numbers, wherein the target sequence number is selected to maximize a quantity of sequence numbers remaining in the set of sequence numbers while satisfying a condition that the quantity of the remaining sequence numbers is less than or equal to the quantity threshold of data packet retransmissions; and
requesting a retransmission of data packets to be retransmitted that correspond to the sequence numbers remaining in the set of sequence numbers.

2. The method according to claim 1, wherein the determining a quantity threshold of data packet retransmissions within a retransmission period based on the data packet loss rate within a retransmission period comprises:
determining, based on a volume of receivable data of a retransmission bandwidth in a transmission bandwidth, a threshold of volume of received data when the data packet loss rate is reached within the retransmission period; and
determining, based on a data volume of each data packet, a quantity threshold of data packet retransmissions corresponding to the threshold of volume of received data.

3. The method according to claim 1, wherein the determining respective key sequence numbers of key data packets matching the set of sequence numbers comprises:
obtaining a maximum sequence number and a minimum sequence number from the set of sequence numbers, and obtaining a key set of sequence numbers that is formed based on respective sequence numbers of the key data packets and matches the set of sequence numbers; and
obtaining key sequence numbers that are greater than the minimum sequence number and less than the maximum sequence number from the key set of sequence numbers.

4. The method according to claim 3, further comprising:
extracting a data packet category identifier carried in a header corresponding to a received data packet; and
adding a sequence number carried in the header to the key set of sequence numbers when the data packet category identifier indicates that the data packet is a key data packet.

5. The method according to claim 1, wherein the obtaining a target sequence number from the key sequence numbers, and deleting sequence numbers less than or equal to the target sequence number from the set of sequence numbers, to maximize a quantity of sequence numbers remaining in the set of sequence numbers, and cause the quantity of the remaining sequence numbers to be less than or equal to the quantity threshold of data packet retransmissions comprises:
successively using the key sequence numbers as a current sequence number in ascending order, and deleting, from the set of sequence numbers that is formed based on the respective sequence numbers of the data packets to be retransmitted, sequence numbers less than or equal to the current sequence number until the quantity of the sequence numbers remaining in the set of sequence numbers becomes less than or equal to the quantity threshold of data packet retransmissions.

6. The method according to claim 1, further comprising:
adding an intermediate sequence number to the set of sequence numbers when a current sequence number of a currently received data packet is greater than a historical sequence number of a previously received data packet and there is the intermediate sequence number between the current sequence number and the historical sequence number.

7. The method according to claim 1, further comprising:
deleting a current sequence number of a currently received data packet from the set of sequence numbers when the current sequence number is less than a historical sequence number of a previously received data packet.

8. The method according to claim 1, further comprising:
calculating a sequence number difference between a current sequence number of a currently received data packet and a historical sequence number of a previously received data packet, when the current sequence number is greater than the historical sequence number and there is an intermediate sequence number between the current sequence number and the historical sequence number;
deleting sequence numbers in the set of sequence numbers when the sequence number difference is greater than a difference threshold, and requesting a transfer of a key data packet matching the current sequence number based on the current sequence number; and adding the intermediate sequence number to the set of sequence numbers when the sequence number difference is less than or equal to the difference threshold.

9. The method according to claim 1, wherein the key data packet is a key frame data packet in audio/video data transmitted in a live broadcasting scenario, and the method further comprises:

obtaining a data packet category identifier of a data packet corresponding to a current sequence number of a currently received data packet when the current sequence number is greater than a historical sequence number of a previously received data packet and the current sequence number and the historical sequence number are continuous sequence numbers, and performing picture rendering based on a key frame data packet corresponding to the current sequence number when the data packet category identifier indicates a key frame data packet.

10. The method according to claim 1, further comprising:

obtaining a data packet category identifier of a data packet corresponding to a current sequence number of a currently received data packet when the current sequence number is greater than a historical sequence number of a previously received data packet and the current sequence number and the historical sequence number are continuous sequence numbers; and performing, when the data packet category identifier indicates a difference frame or a bidirectional difference frame, data superimposition on the difference frame or the bidirectional difference frame and a key frame data packet, and performing picture rendering based on superimposed data.

11. The method according to claim 1, further comprising:

performing smoothing processing on historical delay data corresponding to historical transmission data, to obtain reference delay data; and determining the retransmission period based on the reference delay data, a duration of the retransmission period being greater than or equal to a duration corresponding to the reference delay data.

12. The method according to claim 1, further comprising:

recording a quantity of retransmission requests for each data packet to be retransmitted; and deleting the sequence numbers of the data packets to be retransmitted from the set of sequence numbers when the quantity of retransmission requests for the data packets to be retransmitted is greater than a threshold.

13. The method according to claim 1, wherein the determining a quantity threshold of data packet retransmissions within the retransmission period based on a data packet loss rate within the retransmission period, comprises:

determining, when the data packet loss rate within the retransmission period is greater than a packet loss rate threshold, the quantity threshold of data packet retransmissions within the retransmission period based on the data packet loss rate.

14. The method according to claim 13, further comprising:

requesting a retransmission of the data packets to be retransmitted within the retransmission period when the data packet loss rate within the retransmission period is less than or equal to the packet loss rate threshold.

15. The method according to claim 1, wherein the determining respective key sequence numbers of key data packets matching the set of sequence numbers comprises:

determining respective key sequence numbers of key data packets matching the set of sequence numbers when a quantity of the data packets to be retransmitted within the retransmission period is greater than the quantity threshold of data packet retransmissions within the retransmission period.

16. The method according to claim 15, further comprising:

requesting a retransmission of the data packets to be retransmitted within the retransmission period when the quantity of the data packets to be retransmitted within the retransmission period is less than or equal to the quantity threshold of data packet retransmissions within the retransmission period.

17. A computer device, comprising a memory and one or more processors, the memory storing computer-readable instructions, and the one or more processors, when executing the computer-readable instructions, being configured to implement:

determining a quantity threshold of data packet retransmissions within a retransmission period based on a data packet loss rate within the retransmission period, and obtaining a set of sequence numbers including respective sequence numbers of data packets to be retransmitted within the retransmission period;

determining respective key sequence numbers of key data packets matching the set of sequence numbers;

selecting a target sequence number from the key sequence numbers, and deleting sequence numbers less than or equal to the target sequence number from the set of sequence numbers, wherein the target sequence number is selected to maximize a quantity of sequence numbers remaining in the set of sequence numbers while satisfying a condition that the quantity of the remaining sequence numbers is less than or equal to the quantity threshold of data packet retransmissions; and requesting a retransmission of data packets to be retransmitted that correspond to the sequence numbers remaining in the set of sequence numbers.

18. The computer device according to claim 17, wherein the determining a quantity threshold of data packet retransmissions within a retransmission period based on the data packet loss rate within a retransmission period comprises:

determining, based on a volume of receivable data of a retransmission bandwidth in a transmission bandwidth, a threshold of volume of received data when the data packet loss rate is reached within the retransmission period; and determining, based on a data volume of each data packet, a quantity threshold of data packet retransmissions corresponding to the threshold of volume of received data.

19. The computer device according to claim 17, wherein the determining respective key sequence numbers of key data packets matching the set of sequence numbers comprises:

obtaining a maximum sequence number and a minimum sequence number from the set of sequence numbers, and obtaining a key set of sequence numbers that is formed based on respective sequence numbers of the key data packets and matches the set of sequence numbers; and obtaining key sequence numbers that are greater than the minimum sequence number and less than the maximum sequence number from the key set of sequence numbers.

20. One or more non-transitory computer-readable storage media, storing computer-readable instructions, the computer-readable instructions, when executed by a processor, causing the processor to implement:

determining a quantity threshold of data packet retransmissions within a retransmission period based on a data packet loss rate within the retransmission period, and obtaining a set of sequence numbers including respective sequence numbers of data packets to be retransmitted within the retransmission period;

determining respective key sequence numbers of key data packets matching the set of sequence numbers;

selecting a target sequence number from the key sequence numbers, and deleting sequence numbers less than or equal to the target sequence number from the set of sequence numbers, wherein the target sequence number is selected to maximize a quantity of sequence numbers remaining in the set of sequence numbers while satisfying a condition that the quantity of the remaining sequence numbers is less than or equal to the quantity threshold of data packet retransmissions; and requesting a retransmission of data packets to be retransmitted that correspond to the sequence numbers remaining in the set of sequence numbers.

\* \* \* \* \*